(12) United States Patent
Ivkovich

(10) Patent No.: US 6,583,386 B1
(45) Date of Patent: Jun. 24, 2003

(54) METHOD AND SYSTEM FOR WELD MONITORING AND TRACKING

(75) Inventor: Stephen P. Ivkovich, Horton, MI (US)

(73) Assignee: Impact Engineering, Inc., Jackson, MI (US)

(*) Notice: Subject to any disclaimer, the term of this patent is extended or adjusted under 35 U.S.C. 154(b) by 0 days.

(21) Appl. No.: 09/883,688

(22) Filed: Jun. 18, 2001

Related U.S. Application Data

(60) Provisional application No. 60/255,606, filed on Dec. 14, 2000.

(51) Int. Cl.$^7$ ............................................. B23K 9/095
(52) U.S. Cl. ........................... 219/130.01; 219/125.1; 228/103
(58) Field of Search ................... 219/130.01, 125.1, 219/125.11, 130.21; 228/103; 700/108, 109, 110, 111; 702/184

(56) References Cited

U.S. PATENT DOCUMENTS

| | | | | |
|---|---|---|---|---|
| 3,255,336 A | * | 6/1966 | Purcell | 219/125.11 |
| 4,503,311 A | | 3/1985 | Houchens et al. | |
| 4,721,947 A | * | 1/1988 | Brown | 228/103 |
| 5,245,546 A | | 9/1993 | Iceland | |
| 5,255,197 A | * | 10/1993 | Iida | 700/108 |
| 5,305,183 A | * | 4/1994 | Teynor | 219/130.01 |
| 5,353,238 A | * | 10/1994 | Neef et al. | 702/184 |
| 5,510,596 A | | 4/1996 | Xu et al. | |
| 5,571,431 A | * | 11/1996 | Lantieri et al. | 219/130.01 |
| 5,708,253 A | * | 1/1998 | Bloch et al. | 219/130.01 |
| 5,932,123 A | | 8/1999 | Marhofer et al. | |
| 6,018,136 A | * | 1/2000 | Ohmi et al. | 219/130.01 |
| 6,064,029 A | | 5/2000 | Choi et al. | |
| 6,133,545 A | * | 10/2000 | Okazaki et al. | 219/130.01 |
| 6,140,825 A | | 10/2000 | Fujii et al. | |
| 6,236,017 B1 | * | 5/2001 | Smartt et al. | 219/130.01 |
| 6,271,500 B1 | * | 8/2001 | Hirayama et al. | 219/130.01 |

* cited by examiner

Primary Examiner—Clifford C. Shaw
(74) Attorney, Agent, or Firm—Ian C. McLeod

(57) ABSTRACT

The present invention provides a weld monitoring system and method that monitors and automatically coordinates information on the quality of each weld in a workpiece having one or more welds. In particular, each weld in the workpiece is automatically analyzed at the time it is being made using weld sensors such as those that measure current, wire feed, voltage, and gas flow to produce information on the quality of the weld. Using this information, the welds are sorted, displayed, and logged with workpiece and weld number information which is provided to the operator in real-time and stored in a computer for access at a later time for quality control or other purposes. Therefore, the system and method enables welds of a quality less than a predetermined quality for the weld to be identified in real-time and information concerning any particular weld to be accessed at a later time.

53 Claims, 11 Drawing Sheets

Part History:Work@2

Part Information Summary:05/09/00 09:01:00 Work@2@2 on network WorkTrack
New Part:3
1–05/09/00 09:07:48 Sched:1 Dur: 1.2s pass
2–05/09/00 09:07:51 Sched:1 Dur: 1.7s pass
3–05/09/00 09:07:54 Sched:1 Dur: 1.9s pass
False Arc Start: 05/09/00 09:07:56 Sched:1 Dur: 0.4s pass
4–05/09/00 09:07:59 Sched:1 Dur: 1.4s pass
5–05/09/00 09:08:02 Sched:1 Dur: 1.8s pass
6–05/09/00 09:08:05 Sched:3 Dur: 1.5s Under:V
7–05/09/00 09:08:09 Sched:4 Dur: 1.9s pass
END OF PART–Part unclamped
Part#, ARCAgent Name, Address, Date, Time, Part Name, Clamp Time(sec), # of Welds, # Duration faults, # Process faul
3,Work@2,2,05/09/00,09:01:31,Part test,31,7,0,1,1,11.8,0,0,0.00,0.000

FIG. 6

☐ MCell.arc

File: C:\ARClient\MCell.arc  Part:173  Weld:17  Motoman
6383 of 6416 from TJBack @ 2          Fault limit: 0%
Schedule: 2 @ 02/29/00 00:57:31         Mode: GMAW

|  | Voltage | Current | WireFeed | GasFlow | Aux |
|---|---|---|---|---|---|
| UpFault% | 98% | 0% | 70% | 0% | — |
| UpMar limit | 12% | 12% | 10% | 10% | 0% |
| Max UpMar | 98% | 9% | 100% | 0% | — |
| Upper limit | 22.8V | 270A | 460 ipm | 39 cfh | 0.0 mA |
| Upper bound | 25.5V | 240A | 615 ipm | 37 cfh | — |
| AVERAGE | 25.5V | 235A | 605 ipm | 37 cfh | — |
| Lower bound | 23.8V | 215A | 500 ipm | 33 cfh | 0.0 mA |
| Lower limit | 11.5V | 128A | 425 ipm | 37 cfh | — |
| Max LoMar | 0% | 0% | 18% | 78% | — |
| LoMar limit | 12% | 12% | 10% | 10% | 0% |
| LowFault% | 0% | 0% | 0% | 0% | — |

|  | Low Fault% | LowLim | Actual | UpLim | UpFault% |
|---|---|---|---|---|---|
| Duration: |  | not | 2.6 S | used |  |
| Power Input: | 0% | not | 9588 W | used | 0% |
| Short Freq: | 0% | not | 15 Hz | used | 0% |

FIG. 10

METHOD AND SYSTEM FOR WELD MONITORING AND TRACKING

CROSS-REFERENCE TO RELATED APPLICATION

The application claims the benefit of U.S. Provisional Patent Application Serial No. 60/255,606, filed on Dec. 14, 2000.

STATEMENT REGARDING FEDERALLY SPONSORED RESEARCH OR DEVELOPMENT

Not Applicable.

Reference to a "Computer Listing Appendix submitted on a Compact Disc".

A Computer Program Listing Appendix of the programming language for the present invention is provided on a write-only compact disc (CD), which is hereby incorporated herein by reference. Two copies of the CD are provided. The CDs are labeled Copy 1 and Copy 2. Each CD is entitled "Part Tracking Patent Impact Engineering May 29, 2001" and each CD is hereby incorporated herein by reference. Each CD, which has an IBM-PC machine format and is compatible with MS-Windows, contains the following 14 ASCII compliant files of the programming code of the arc-weld monitoring with part-tracking system of the present invention.

1. Network.cpp, which in its present format was created Apr. 10, 2001, and contains 126,980 bytes.
2. Network.h, which in its present format was created Mar. 30, 2001, contains 14,802 bytes.
3. Node.cpp, which in its present format was created May 21, 2001, contains 269,010 bytes.
4. Node.h, which in its present format was created Apr. 10, 2001, contains 27,184 bytes.
5. PartHist.cpp, which in its present format was created Jan. 24, 2001, and contains 8,890 bytes.
6. PartHistory.h, which in its present format was created Jan. 24, 2001, contains 4,386 bytes.
7. PartTrackingConfigDlg.cpp, which in its present format was created Jan. 24, 2001, contains 9,166 bytes.
8. PartTrackingConfigDlg.h, which in its present format was created Jan. 24, 2001, contains 4,564 bytes.
9. PartView.cpp, which in its present format was created Nov. 11, 2000, contains 11,439 bytes.
10. PartView.h, which in its present format was created Sep. 22, 2000, contains 3,648 bytes.
11. WkTrkDlg.cpp, which in its present format was created Dec. 11, 2000, contains 24,619 bytes.
12. WkTrkDlg.h, which in its present format was created Dec. 12, 2001, contains 3,524 bytes.
13. AdvancePartTrackingConfigDlg.cpp, which in its present format was created May 2, 2001, contains 6,000 bytes.
14. AdvancePartTrackingConfigDlg.h, which in its present format was created Jan. 24, 2001, contains 2,226 bytes.

The files are readable using an ASCII text reader such as Microsoft WordPad.

BACKGROUND OF THE INVENTION (1) Field of the Invention

The present invention relates to a weld monitoring system and method that monitors and automatically coordinates information on the quality of each weld in a workpiece having one or more welds. In particular, each weld in the workpiece is automatically analyzed at the time it is being made using weld sensors such as those that measure current, wire feed, voltage, and gas flow to produce information on the quality of the weld. Using this information, the welds are sorted, displayed, and logged with workpiece and weld number information which is provided to the operator in real-time and stored in a computer for access at a later time for quality control or other purposes. Therefore, the system and method enables welds of a quality less than a pre-determined quality for the weld to be identified in real-time and information concerning any particular weld to be accessed at a later time.

(2) Description of Related Art

Many high volume, complex welded assemblies are produced using manual or semi-automated production welders. The repetitive nature of these welding operations and the high production rates that are required eventually lead to welder fatigue. Therefore, missing or defective welds on these welded assemblies is a major quality assurance problem. Missing or defective welds can lead to structural failure of the welded assemblies which can be catastrophic for downstream users of these welded assemblies.

To identify defective welds, sensors that measure current, wire feed, voltage, and gas flow are used to enable the quality of a weld to be determined. The information produced by the sensors allows defective welds or welds of a quality less than a pre-determined quality to be identified. The following U.S. Patents exemplify the state of the art in controlling or monitoring the quality of welds made in a welding operation.

U.S. Pat. No. 4,503,311 to Houchens et al. discloses a method and apparatus for detecting the onset of melting in a resistance spot weld, which enables the prediction of weld quality to be determined. The method measures the weld resistance at many points during the formation of the weld, storing those resistance values, calculating a rate of change of resistance curve from the stored resistance values, locating the maximum rate of change of resistance occurring prior to the resistance peak and locating the time subsequent to the maximum rate of change that the rate of change curve reaches a specified fraction of its maximum, which time occurs at the knee of the resistance curve which approximates the onset of melting.

U.S. Pat. No. 5,245,546 to Iceland discloses a welding arc length control system. The system includes a power source for providing welding current, a power amplification system, a motorized welding torch assembly connected to the power amplification system, a computer, and a current pickup means. The computer is connected to the power amplification system for storing and processing arc weld current power source and to the welding torch assembly for providing weld current data to the computer. Therefore, the system maintains the desired arc length as the welding current is varied during operation, which maintains consistent weld penetration.

U.S. Pat. No. 5,510,596 to Xu et al. discloses an arc welding device apparatus for controlling an arc welder through use of a neural network in real-time. The invention also records output from an arc welding apparatus indicating whether penetration has occurred during the welding process and can also activate an alarm when penetration occurs during the arc welding process, which indicates that the weld is solid.

U.S. Pat. No. 5,932,123 to Marhofer et al. discloses a mobile automated pipeline welding and quality control system comprising a gas metal arc welding carriage and a weld data monitor and acquisition unit. The system comprises a welding machine for welding pipes and a weld monitor consisting of, inter alia, a current detector for detecting welding current applied to the welding torch, a voltage detector for detecting welding voltage, and a travel speed detector for detecting the travel speed of the welding machine. The weld monitor includes a memory, a microprocessor for successively recording the detected current, voltage, and travel speed parameters in the memory, and means for specifying the recording intervals of the parameter. The weld monitor displays one or more of the detected parameters in substantially real-time.

U.S. Pat. No. 6,064,029 to Choi et al. discloses a method and apparatus for controlling the quality of a resistance spot weld. The method estimates the quality of a spot weld by using a nugget penetration of the resistance spot weld and a nugget size, which are estimated by using the Hidden Markov Model method.

U.S. Pat. No. 6,140,825 to Fujii et al. discloses a method and apparatus for evaluating quality of a resistance weld. The method measures instantaneous values of welding current to determine the quality of the weld as it is being formed.

While the above methods are capable of determining the quality of a weld and present information about the quality of the weld, the above methods do not automatically track and verify a series of independent welds performed by one welder or robot on one or more workpieces in a welding operation for producing a welded assembly and present the information after the weld is made to the welder in real-time to enable the welder to take appropriate remedial action. Nor do the above methods coordinate the information from a series of welds on one or more workpieces in one or more welding operations and display the information graphically for each weld in each of the welded assemblies wherein the quality of each of the welds is displayed superimposed on an image for each of the welded assemblies, which enables in an inspection process to determine which of the welded assemblies pass or fail a quality control inspection.

SUMMARY OF THE INVENTION

The present invention provides a weld monitoring system and method that monitors and automatically coordinates information on the quality of each weld in a workpiece having one or more welds. In particular, each weld in the workpiece is automatically analyzed at the time it is being made using weld sensors such as those that measure current, wire feed, voltage, and gas flow to produce information on the quality of the weld. Using this information, the welds are sorted, displayed, and logged with workpiece and weld number information which is provided to the operator in real-time and stored in a computer for access at a later time for quality control or other purposes. Therefore, the system and method enables welds of a quality less than a predetermined quality for the weld to be identified in real-time and information concerning any particular weld to be accessed at a later time.

In particular, the present invention provides a method for welding components of a workpiece with multiple arc welds in a fixture using a consumable electrode wire, melting the wire by heat from an electric arc having a current and voltage which comprises: (a) providing a system with the fixture having (i) one or more weld sensor means for detecting a quality of each weld on the workpiece on the fixture for welding the workpiece; (ii) a program in a computer to continuously monitor the output from the one or more weld sensor means; and (iii) a switch means connected to the computer for starting a period during which the multiple welds are monitored and then completed and for terminating the monitoring; (b) placing components which form the workpiece in the fixture, welding the workpiece with the multiple welds, while determining the quality of each weld; and (c) removing the workpiece from the fixture, wherein the program in the computer provides monitoring of each of the multiple welds by means of the one or more weld sensor means between the starting and terminating of the monitoring by the switch means. Preferably, the method provides the monitoring in real-time and for later analysis.

In particular embodiments of the method, the weld sensor means is selected from the group consisting of a sensor that measures the voltage of the arc, a sensor that measures the current between the components of the workpiece and the wire being welded, a sensor that measures the rate of gas flow, and a sensor that measures a rate of feed of the wire to the arc.

In further embodiments of the method, the multiple welds are performed as simultaneous multiple welds or the multiple welds are performed in series.

The method is useful wherein the welding is performed manually or is performed by computer controlled robotic welders.

Preferably, the program in the computer provides a completion or fault signal for each of the multiple welds. More preferably, the program in the computer provides a completion or fault signal for each of the multiple welds with a display of the workpiece and the multiple welds on a computer display screen so that individual welds of the multiple welds are shown as completed or having the fault.

In a further embodiment of the method, the switch means is activated or deactivated as a result of opening or closing of a holding means on the fixture for holding the component parts during the welding.

In an embodiment further still of the method, in addition the program transfers the weld data to a second computer system programmed for receiving a series of weld data for multiples of the workpieces and for selective analysis of the weld data. Preferably, the second computer has a computer display screen which provides a visual display, a printer which provides a printout, or both of the weld data for each of the multiple of the workpieces.

The present invention also provides a system for monitoring welding of components of a workpiece with multiple arc welds in a fixture using a consumable electrode wire, melting the wire by heat from an electric arc having a current and voltage which comprises: (a) one or more weld sensor means to be mounted on equipment for the welding; (b) a computer with a program to continuously monitor output from the one or more weld sensor means and to provide weld data to the computer; and (c) switch means connected to the computer for starting a period during which the multiple welds are detected by the one or more weld sensor means and monitored by the computer and for terminating the period, wherein the system is used with a fixture with a holding means for welding the components into the workpiece and wherein the program monitors each of the welds for a fault by means of the one or more weld sensor means between the starting and terminating of the monitoring by the switch means. In particular embodiments, the switch means are started and stopped by opening and closing the holding means which are clamps. Preferably, the system provides the monitoring in real-time and for later analysis.

In a particular embodiment of the system, the weld sensor means is selected from the group consisting of a sensor that measures the voltage of the arc, a sensor that measures the current between the components of the workpiece and the wire being welded, a sensor that measures the rate of gas flow, and a sensor that measures a rate of feed of the wire to the arc. In a further embodiment, the switch means is activated or deactivated as a result of opening or closing of a holding means on the fixture for holding the components during the welding.

In a particular embodiments of the system, the system is adapted for monitoring welds produced by one or more computer controlled robots for the welding.

Preferably, in the system the computer provides a weld completion or fault display on a computer display screen. More preferably, the computer provides a weld completion or fault display on a computer display screen with a display of the workpiece and the multiple welds so that individual welds are shown as completed or with the fault.

In an embodiment further still, the system provides a second computer system which is programmed for receiving a series of weld data for multiples of the workpieces and for selective analysis of the weld data. Preferably, the second computer has a computer display screen which provides a visual display, a printer which provides a printout, or both of each of the multiples of the workpieces.

Finally, the present invention provides in a system for monitoring in a welding operation quality of multiple welds on a workpiece using one or more weld sensors at the location of each of the multiple welds wherein the one or more weld sensors provide information relating to the quality of each weld as it is being made on the workpiece, the improvement comprising: a control means in the system, which determines the start of the multiple welds on the workpiece and the end of the multiple welds on the workpiece or measures a duration of time the workpiece is to be acted upon in the welding operation; and a computer program in the system which monitors the multiple welds on the workpiece between the start and the end and coordinates information relating to the quality of each weld in the multiple welds and displays the information.

In particular embodiments, the multiple welds are monitored by the system simultaneously or are monitored in the system in series and further wherein the monitoring is where the welding is manual or where the monitoring is of welds made by one or more computer controlled robotic welders. Preferably, the program in the computer provides a completion or fault signal for each of the multiple welds. Most preferably, the program in the computer provides a completion or fault signal for each of the multiple welds with a display of the workpiece and the multiple welds on a computer display screen so that individual welds of the multiple welds are shown as completed or having the fault on the computer display screen. It is further preferable, that in addition the program transfers the weld data to a second computer system programmed for receiving a series of weld data for the workpiece and for selective analysis of the weld data, in particular wherein the second computer has a second computer display screen which provides a visual display of the weld data, a printer which provides a printout of the weld data, or both of the workpiece.

In particular embodiments of the system, the weld sensor means is selected from the group consisting of a sensor that measures the voltage of the arc, a sensor that measures the current between the components of the workpiece and the wire being welded, a sensor that measures the rate of gas flow, and a sensor that measures a rate of feed of the wire to the arc.

OBJECTS

Therefore, it is an object of the present invention to provide for a welding operation for producing a welded assembly, a system that tracks and automatically coordinates information on the quality of each weld in a workpiece having a plurality of welds wherein each weld in the workpiece is automatically analyzed at the time it is being made using sensors such as those that measure current, wire feed, voltage, and gas flow to produce information on the quality of the weld which is presented to the operator in real-time and stored in a computer for analysis and for quality control inspection wherein each of the welds of the welded assembly are superimposed on an image of the welded assembly and ranked according to the welds relationship to a predetermined quality.

These and other objects of the present invention will become increasingly apparent with reference to the following drawings and preferred embodiments.

DESCRIPTION OF THE DRAWINGS

FIG. 6 shows an example of a computer screen display wherein the output provides a tabular display of part-tracking results from a welding operation consisting of a series of seven independent welds.

FIG. 10 shows an example of a computer screen display wherein the output is a report view displaying information about a single weld in a GMAW welding operation.

DETAILED DESCRIPTION OF THE INVENTION

Figure 1:
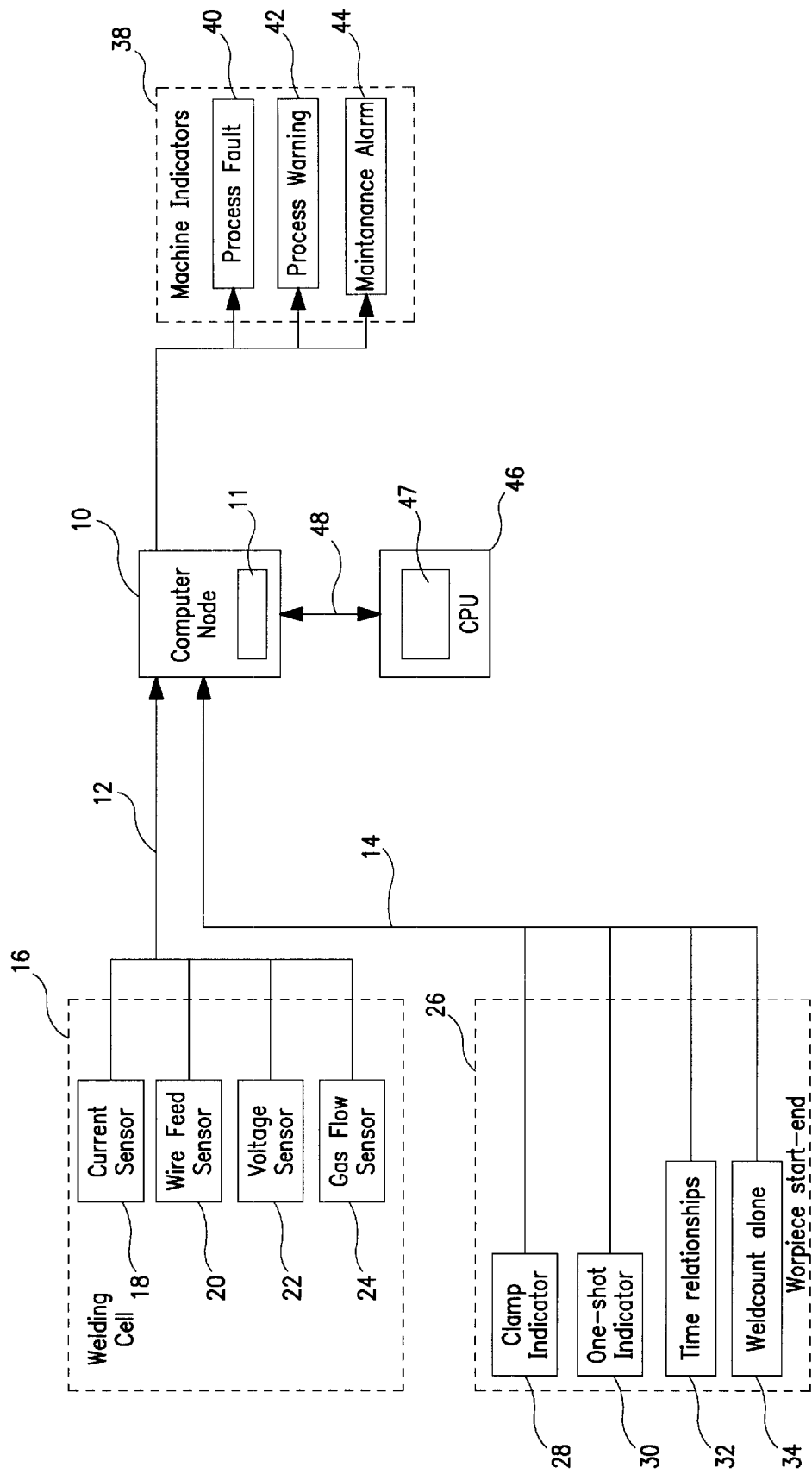
FIG. 1 is a schematic diagram of the basic operating setup of the arc-weld monitoring with part-tracking system of the present invention.

All patents, patent applications, government publications, government regulations, and literature references cited in this specification are hereby incorporated herein by reference in their entirety. In case of conflict, the present description, including definitions, will control.

The term "welding cell" refers to the area where one or more workpieces are welded in one or more welding operations and includes a welding operator, the one or more workpieces, and welding equipment or apparatus.

The term "welding operation" refers to the process of applying either a single weld to a workpiece or applying a series of welds to a workpiece.

The term "part-tracking" refers to the process of automatically tracking and verifying a series of independent welding operations performed by a welder or robot in a welding cell on a workpiece to produce a welded assembly.

The term "coordinated part-tracking" refers to the process of synchronizing the information obtained from multiple welding operations from multiple welding cells that produces a single welded assembly and presenting the information in a single representation.

The term "welding operator" refers to either a robotic welder or a person who manually performs the welding.

The term "work procedure" refers to a set of welds on one or more workpieces in a welding cell.

The term "welded assembly" refers to the one or more workpieces wherein all the welds in the work procedure for the welding cell have been completed.

The term "state machine algorithm" refers to analyzing and identifying the operation of a machine by first understanding and breaking down its operation into discrete states with known transition steps between them.

The arc-weld monitoring with part-tracking system of the present invention enables missing or defective welds in welded assemblies produced in a welding operation to be identified and corrected by using coordinated part-tracking. The system provides a comprehensive, automated monitoring system for real-world production welding operations. The novel part-tracking function of the arc-weld monitoring with part-tracking system automatically tracks and verifies the complex sequence of welds (work sequence) on a single welded assembly produced in a welding operation performed in a welding cell. Thus, the arc-weld monitoring with part-tracking system is an improvement over the prior art weld monitoring systems because it combines in one process, an arc-weld monitoring function, which monitors for in-process faults on the individual welds in a workpiece and can be any prior art arc-weld monitoring system, with the novel part-tracking function of the present invention, which tracks the weld sequence used in completing the welded assembly from one or more workpieces.

By monitoring the welding process in a welding cell both before and after each individual weld is performed, automated work instructions comprising information about the welding process and weld instructions are automatically presented to the operator. In this manner, the arc-weld monitoring with part-tracking system and the operator work together to verify or inspect the welded assembly both during the welding operation and at the conclusion of the welding operation wherein the final disposition of each weld on the assembly is displayed to the operator, preferably superimposed on an image of the welded assembly. Therefore, because of the novel part-tracking ability, the arc-weld monitoring with part-tracking system is able to reliably detect missing welds on complex welded assemblies and present the location of these missing welds to the operator. The arc-weld monitoring with part-tracking system also compiles strategic process information necessary for evaluating and improving the capability of the welder, and it measures the cost and productivity of the particular welding operation.

For manual or robotic welding cell applications, coordinated part-tracking breaks down and identifies information about the individual welds on the workpiece and presents this information to the welder or welding cell operator. The arc-weld monitoring with part-tracking system is operably connected to the manual or robotic welding operation with simple weld process sensors that include, but are not limited to, sensors that measure current, voltage, wire feed, and gas flow. The weld sensors provide information relating to the quality or success of each particular weld as it is being made.

Also operably connected to the arc-weld monitoring with part-tracking system is a switch or sequencing means which enables the system to determine the start of a series of welds on a workpiece and the end of the series of welds on the workpiece or measures the duration of time a particular workpiece is to be acted upon in a welding cell. Switch or sequencing means include, but are not limited to, detecting a fixture clamp and release digital input/output line, using a palm button, or other one-shot operator indicator of workpiece start or workpiece end; using an analysis of the inherent time delays and inter-weld sequencing times associated with completing a welded assembly (time between welded assemblies); and using a pre-specified number of welds to auto sequence through the sequence of welds on a workpiece or welded assembly during the welding operation.

In producing a welded assembly, it is common practice to stage or breakdown welding operations for the welded assembly into one or more welding operations and assign particular welds or series of welds to each of the welding operations. The welding operation for each stage is then performed in a welding cell that corresponds to the particular stage or breakdown. Often a welded assembly will go through multiple stages of welding with the final welded assembly inspected at an inspection station following the last welding stage. However, information relating to each individual weld for each welded assembly is not available to the inspection station. Therefore, defective or missing welds can in some cases escape detection, particularly for complicated welded assemblies comprising a complicated series of welds. The novel part-tracking function of the arc-weld monitoring system reduces the likelihood that welded assemblies that may have missing or defective welds will escape detection because the part-tracking system coordinates and synchronizes the welding information from all the stages involved in welding of a welded assembly and presents the coordinated information to the inspection station.

The coordinated information for each welded assembly is presented on a computer display screen to the inspection station as an image of the particular welded assembly with the position of the welds and their quality superimposed thereon. By observing the image that corresponds to the welded assembly, the inspection station can rapidly and accurately determine whether the welded assembly passes inspection. Preferably, the missing or defective welds are indicated by one color whereas welds that are not defective are indicated by another color. Thus, inspection and quality assurance functions are improved.

The part-tracking function is the novel element of the arc-weld monitoring with part-tracking system of the present invention. The part-tracking function provides real-time information to the user or welder about the quality of a weld or welds on a workpiece and the number of welds for a workpiece during the welding operation, and enables such weld-related information for each workpiece to be maintained, stored, or archived for weld analysis and quality control inspection at a time other than during the welding operation. The part-tracking function is provided by a computer program that can be incorporated into any prior art arc-weld monitoring system with appropriate modifications to programs comprising the prior art system. The part-tracking function automatically tracks and organizes information relating to the quality of one or more welds on a workpiece and relates the information to the schedule specifications for each weld using a state machine algorithm which processes the information provided by the weld process sensors. The part-tracking function also organizes the information relating to the start and end of each workpiece, which can be accomplished by detecting a fixture clamp and release digital input/output line, using a palm button or other one-shot operator indicator of a weld start or end, using analysis of the inherent time delays and inter-weld sequencing times associated with completing a weld on a workpiece, or using a pre-specified number of welds to auto-sequence through the numbering of welds. Thus, the part-tracking function automatically verifies each weld according to unique process monitoring schedule specifications of process dynamics and expected duration.

Of particular importance to the system, the part tacking function detects and ignores false arc starts (arc strikes which are not actual welds), which prevents false arc starts from being counted as welds, thereby preventing false readings in the number of welds that have been performed or mis-synchronization of the welding sequence. Because the part-tracking function verifies all welds that have been made on the part, it detects and identifies missing welds on the workpiece. The part-tracking function also analyzes and verifies that the inter-weld sequence times are correct and it provides automated scheduling and alerting of preventive maintenance functions that are based on measured real-time information from the welding cell. Because the part-tracking function enables internal welding schedule settings to be made, weld monitoring schedules are automatically set by the system, independent of an external source.

In manual welding operations, the part-tracking function provides automated work instructions or information to the welder and provides weld process quality information to the welder in real-time during the welding process. The automated work instructions provide a visual or audible signal to the welder that for the weld being made, the required weld length has been obtained and the welder should stop, thereby reducing the probability that the weld will be over-welded. It also provides post-weld quality results to the operator and instructions to the operator for the next weld to be performed. The instructions can include location for the next weld, procedure for making the weld, tips for preventing a defective weld, warnings related to making the weld, and quality expectations for the weld. Preferably, the information is provided to the welder by using audible signals, or by using light emitting diode (LED) or text displays, which in a preferred embodiment are positioned in the welder's helmet so as they can viewed in the welder's peripheral vision.

The part-tracking function also provides coordinated part-tracking by maintaining a record of the welds and their quality for each welded assembly, which can be accessed by the welder, the welder's supervisor, or by an inspector during final inspection of the welded assembly. In a preferred embodiment, the coordinated part-tracking information for each welded assembly is presented on a computer display screen by superimposing weld-quality information for a particular welded assembly on an image representing the welded assembly. In addition, coordinated part-tracking presents, logs, and reports weld sequence historical information, including analysis of each weld, for guiding post-welded assembly inspection and quality assurance procedures.

The part-tracking function can include an automated learning function that learns a welding sequence for a particular workpiece type and sets up a verification protocol for the welding sequence for the particular workpiece type. The part-tracking function can also coordinate information provided by one or more infrared cameras positioned around the welding cell and trained on the workpiece to facilitate identification and verification of the location of welds on the workpiece.

The following are examples of welding operations that can be monitored by the arc-monitoring with part-tracking system of the present invention.

A simple-cell welding operation is an operation that uses one welding robot or manual welder, one workpiece type, one fixture, one stage, and immediately displays the welding results to the operator. One workpiece type is referred to as one workpiece at a time. Often in a simple-cell welding operation, provisions need to be made for switching the workpiece type to another workpiece type for a period of time, which can include changing the fixture. In the simple-cell welding operation, one workpiece or a set of workpieces is mounted in a single fixture. The workpiece is clamped in place and the welding is performed by one robot or manually. All welds are accomplished in one clamping cycle or stage. A computer screen display shows the results of the welding operation. Manual TJ Black frame application (JCI, Cadiz, Ky.) and Manual Seat Base application (JCI, Reynosa, Mexico) are examples of simple cell welding operations, which can be used with the arc-welding monitoring with part-tracking system.

A simple dual-fixture welding operation uses one robot, one workpiece type, two identical fixtures, one stage, and welding results are displayed on removal of the workpiece. Often in a simple dual-fixture welding operation, provisions need to be made for switching the workpiece type to another workpiece type for a period of time, which can include changing the fixture. A welding cell for simple dual-fixture welding operation produces one type of welded assembly, but has two identical fixtures for producing the welded assembly. Generally, while the operator is mounting one or more workpieces in one fixture, one or more workpieces in the other fixture are being welded by a welding robot. The fixtures are usually mounted on a turn table, a flip table, or separate sliding table such that one fixture is facing the operator and the other is facing the welding robot. All welds are accomplished in one clamping cycle or stage. When a welding operation is completed, the welded assembly is rotated back to the operator for handling and removal. When the welded assembly has been rotated back to the operator, a computer screen display shows the results of the welding operation. If a dual workpiece screen display is used, then the operator can simultaneously see workpiece information for the welded assembly being handled and the one or more workpieces being welded. Basic Motoman AWII Cell with One Robot and 2 Window RPT Cell with Identical Fixturing are examples of simple dual-fixture welding cell operations, which can be used with the arc-welding monitoring with part-tracking system.

A simple multi-robot cell welding operation is an operation that uses multiple welding robots or manual welders, one workpiece, one fixture, one stage, and immediately displays the welding results. Often in a simple multi-robot cell welding operation, provisions need to be made for switching the workpiece type to another workpiece type for a period of time, which can include changing the fixture. In the simple multi-robot welding cell operation, one or more workpieces are mounted in a single fixture. The one or more workpiece are clamped in place and the welding is performed simultaneously by multiple robots or manually. All welds are accomplished in one clamping cycle or stage. Afterwards, a computer display screen shows the results of the welding operation. The Harvard Industries four robot cell is an example of a simple multi-robot cell welding operation which can be used with the arc-welding monitoring with part-tracking system.

A simple dual-robot, dual-fixture welding operation uses two robots, one workpiece type, two identical fixtures, one stage, and welding results are displayed on removal of the workpiece. In a simple dual-robot, dual-fixture welding operation, often provisions need to be made for switching the workpiece type to another workpiece type for a period of time, which can include changing the fixture. The welding cell produces one type of welded assembly, but has two identical fixtures for producing the welded assembly. Generally, while the operator is mounting one or more workpieces in one fixture, the one or more workpieces in the other fixture are being welded by two welding robots. The fixtures are usually mounted on a turn table, a flip table, or separate sliding table such that one fixture is facing the operator and the other is facing the welding robots. All welds are accomplished in one clamping cycle or stage. When a welding operation is completed, the welded assembly is rotated back to the operator for handling and removal. When the welded assembly has been rotated back to the operator, a computer display screen shows the results of the welding operation. If a dual-workpiece screen is used, then the operator can simultaneously see workpiece information for the welded assembly and the one or more workpieces in the other fixture being welded. Basic Motoman AWII Cell with Two Robots and Tenneco strut application are examples of simple dual-robot, dual-fixture welding cell operations, which can be used with the arc-welding monitoring with part-tracking system.

A simple dual-robot, dual two-workpiece fixture welding operation uses two robots, two workpiece types, two identical fixtures, one stage, and welding results are displayed on removal of the workpiece. Two-workpiece types is referred to as two workpieces at a time. In a simple dual-robot, dual two-workpiece fixture welding operation, often provisions need to be made for switching the workpiece types to other workpiece types for a period of time which can include changing the fixture. The welding cell produces one type of welded assembly, but has two identical fixtures for producing the welded assembly. Generally, while the operator is mounting the workpieces in one fixture, the workpieces in the other fixture are being welded by two welding robots. The fixtures are usually mounted on a turn table, a flip table, or separate sliding table such that one fixture is facing the operator and the other is facing the welding robots. All welds are accomplished in one clamping cycle or stage. When a welding operation is completed, the welded assembly is rotated back to the operator for handling and removal. When the welded assembly has been rotated back to the operator, a computer display screen shows the results of the welding operation. If a dual-workpiece screen is used, then the operator can simultaneously see workpiece information for the welded assembly being handled and the workpiece being welded. Basic Motoman AWII Cell with Two Robots and New Motoman cells at JCI, Cadiz (Change-over type) are examples of simple dual-robot, dual two-part fixture welding cell operations, which can be used with the arc-welding monitoring with part-tracking system.

A dual-robot, dual-workpiece, dual-fixture welding operation uses two robots, two workpiece types, two different fixtures, one stage for each fixture, and welding results are displayed on removal of the workpiece. In a dual-robot, dual workpiece, dual-fixture welding operation, often provisions need to be made for switching the workpiece types to other workpiece types for a period of time, which can include changing the fixture. The welding cell produces two type of welded assemblies simultaneously, using two different fixtures. A first workpiece fixture holds the workpiece components for one welded assembly and a second fixture holds the workpiece components for a second welded assembly. Generally, while the operator is mounting a workpiece in one fixture, the workpiece in the other fixture is being welded by two welding robots. All welds are accomplished in one clamping cycle or stage. When a welding operation is completed, the welding assembly is rotated back to the operator for handling and removal. When the workpiece has been rotated back to the operator, a computer display screen shows the results of the welding operation. If a dual-workpiece screen is used, then the operator can simultaneously see workpiece information for the welded assembly being handled and the workpiece being welded. Teleflex side-by-side brake petal cell (by AccuBilt) and the Motoman AWII Cell with Two Robots are examples of simple dual-robot, dual-workpiece, dual-fixture welding cell operations which can be used with the arc-welding monitoring with part-tracking system.

A dual-robot, dual-workpiece, dual-stage, dual-fixture welding operation uses two robots, two workpiece types, two different fixtures, two stages, and welding results are displayed on removal of the workpiece. In a dual-robot, dual-workpiece, dual-stage, dual-fixture welding operation, often provisions need to be made for switching the workpiece types to other workpiece types for a period of time, which can include changing the fixture. The welding cell produces two types of welded assemblies simultaneously using different fixtures (staged). A first workpiece fixture holds the first stage workpiece components for the two assemblies side-by-side and a second fixture (on the other side of a rotisserie or rotating table fixture) holds the workpiece components welded in the first fixture with additional workpiece components added for welding in the second stage. Generally, while the operator is mounting a workpiece in one fixture, the workpieces in the other fixture are being welded by the welding robots. All welds are accomplished in two clamping cycles or stages. When a welding operation is completed, the welded assembly is rotated back to the operator for handling and removal. When the workpiece has been rotated back to the operator, a computer display screen shows the results of the welding operation. If a dual-workpiece screen is used, then the operator can simultaneously see workpiece information for the welded assembly being handled and the workpiece being welded. The Setex dual-stage cell is an example of a simple dual-robot, dual-workpiece, dual-stage, dual-fixture welding cell operation, which can be used with the arc-welding monitoring with part-tracking system.

An assembly line welding cell operation uses multiple robots, one workpiece type, multiple fixtures, multiple stages, and welding results are displayed on a computer display screen on removal of each welded assembly. In an assembly line welding cell operation, often provisions need to be made for switching the workpiece type to other workpiece type for a period of time which can include changing the fixture. The welding cell produces one type of welded assembly but has a sequence of fixtures wherein workpieces are gradually built up and welded. Each stage (sequences) can have a unique fixture and can add unique welds to the workpiece. Alternatively, fixtures can move through the station with the welded assemblies. Each stage can have one or more welders or there can be stages that simply move the part with no welding (delay stage). Generally, an operator mounts the workpiece to be welded in one fixture (stage) while the other stages are being welded. The workpiece progresses through each stage in sequence and at the end of the operation the information for the welded assembly is displayed on a computer display screen to a quality control inspector. The tower carousel cell, Valley Industries multi-Station hitch cell, and Ford Rouge Plant frame transfer line are examples of assembly line welding cell operations, which can be used with the arc-welding monitoring with part-tracking system.

Operation of the arc-weld monitoring with part-tracking system.

Each welding cell consists of a welding power supply, fixture or clamps for holding the workpiece to be welded, a welding torch, and a welder, which can be a person or a robot. The underlying welding process in a welding cell includes, but is not limited to, shielded gas metal arc welding (GMAW or MIG), shielded gas tungsten arc welding (GTAW or TIG), shielded metal arc welding (SMAW or stick welding), flux core arc welding (FCAW), and submerged arc welding (SAW).

The welder begins a welding operation in a welding cell by putting or clamping one or more workpieces to be welded into a fixture, which positions the workpiece or workpieces in the proper orientation for welding. To create an individual weld, the welder positions the welding torch to the location on the workpiece or workpieces where the weld is to be begin, starts the power supply to create a welding arc, moves the welding torch to apply the weld to the location in a pre-specified manner, which takes into account duration of the weld application and the length of the weld, and then stops the welding process when the weld is complete. In a typical welding operation, one or more sequential welds are applied to a workpiece or workpieces. The welded assembly is then removed or unclamped from the fixture and transferred to the another welding cell for additional welding operations or into a holding area for welded assemblies.

During the welding operation, the arc-weld monitoring with part-tracking system obtains information about the welding process from one or more weld sensor means including, but not limited to, weld sensors that measure current, voltage, wire feed, or gas flow, which are operably connected to a computer node. The current flow that is measured is the current that is applied to a particular weld. The duration of the current flow is used to identify in a welding operation when a particular weld starts and when it stops. The measurements from the voltage, current, gas, and wirefeed sensors can be used to identify different types of weld defects such as grounding problems, workpiece fitup and alignment problems, weld equipment problems, and gross porosity. Thus, analysis of the data from the weld sensors indicate whether a weld is satisfactory or faulty. The above weld sensor means are easily applied to any commercially available manual or robotic welding equipment.

The arc-weld monitoring with part-tracking system acquires, then digitizes and analyzes the information obtained by the computer nodes from the weld sensors. The information from the computer nodes is then presented to a computer processing unit (CPU) operably connected to the computer nodes and running the arc-weld monitoring with part-tracking system program. Preferably, the CPU has an operating system such as WINDOWS (registered trademark of Microsoft Corporation, Redman, Wash.), Linex, or UNIX for running the arc-weld monitoring with part-tracking system program and a computer display screen means for presenting information processed by the arc-weld monitoring with part-tracking system program.

The start and the end periods of a welding operation consisting of a plurality of welds in a workpiece is determined using one of a plurality of switch means such as using a digital output from the welding fixture such as a programmable logic controller (PLC), robot controller, or sensor to indicate when a workpiece in a fixture is clamped and when it is released; a palm button, proximity switch, or other one-shot operator indicator to identify when a new weld on a workpiece is starting; a palm button, proximity switch, or other one-shot operator indicator to identify when a weld on a workpiece has been completed; using analysis of the inherent time delays and inter-weld sequencing times associated with completing a weld or series of welds on a workpiece; and a pre-specified number of welds to auto-sequence through the numbering or counting process of the welds on a workpiece. As an example, the switch means can be activated as a result of opening or closing of a holding means, which can be clamps, on the fixture for holding the components of a workpiece during the welding operation. Any one or combination of the above methods can be used by the arc-weld monitoring with part-tracking system of the present invention to synchronize the welding information to the actual welds on the workpiece.

Machine indicators, which are multiple digital outputs, are available to be used by the welding cell operator or automated robot controller machinery to take action based on the automated results from the coordinated part-tracking function of the arc-weld monitoring with part-tracking system. Common usages for the machine indicators include, but are not limited to, stop machine until repair action can be taken, automatically send the welded assembly to a scrap bin, automatically paint-mark a welded assembly to indicate the welded assembly has defective welds, turn on a siren or alarm light for the operator, and hold the fixture clamps in place until operator action is taken. Basic outputs for machine indicators provided by the arc-weld monitoring with part-tracking system include, but are not limited to, process fault, which is an indication that some major problem has occurred with the workpiece in question; process warning, which is an indication that some minor problem has occurred with the workpiece in question; and maintenance alarm, which is an indication that some normal maintenance procedure such as preventative maintenance or scheduled maintenance is required based on accumulated information from the welding cell such as the number of welded assemblies completed, amount of wire used, and type and number of faults detected. The maintenance alarm is targeted to wire replacement, torch tip replacement, fixture tooling, tip tooling, or cell tooling.

For the coordinated part-tracking function of the arc-weld monitoring with part-tracking system, the CPU monitors the information for each weld for a fault by means of the one or more weld sensor means between the starting and terminating of the monitoring by the switch means and determines how that particular weld fits into the overall welding scheme or schedule for the workpiece being welded. Thus, in a coordinated and cooperative manner, the arc-weld monitoring with part-tracking system performs weld monitoring, part-tracking, reporting, and display of the resulting information to the operator of the welding operation, inspector of the welded assembly either during or at a time subsequent to the welding operation, or the manual welder performing the welding operation. Based on the expected weld to be next completed, the arc-weld monitoring with part-tracking system automatically sets the weld monitoring schedule, which comprises the expected weld process parameters and duration for each weld. Therefore, no external setting of weld schedules is required.

An important capability of the coordinated part-tracking function of the arc-weld monitoring with part-tracking system is the system's ability to identify "false arc starts" and then not increment the weld count when a false arc start has been identified. This capability is particularly important in tracking manual welding applications because welders often strike false arcs on the welding fixture when they knock (burn) off excess wire or when they are searching for the proper location for the starting point of a weld. These false arc starts are detected by the arc-weld monitoring with part-tracking system and ignored by the part-tracking function. The arc-weld monitoring with part-tracking system classifies false arc starts based on the actual duration of the arc, which can be any time period programmed into the arc-weld monitoring with part-tracking system. In general, any arc with a duration shorter than 0.8 seconds is considered a false arc start.

False arc starts are recorded by the system and can be used as an early indicator of equipment problems for automated systems or as an indicator of training requirements for manual welders. In some cases, false arc starts on a welded assembly are undesirable and recording the false arc start by the system enables the welded assembly to be rejected as a quality problem.

The computer node displays real-time digital output information to the welder about the weld just completed and the next weld in the sequence to be performed, which can be displayed on a computer display screen that uses a 4 line by 20 (4×20) character text display. This real-time digital output information is called automated work instructions. Information, which is context specific to the next weld in the welding sequence, can be entered beforehand by the welder or the setup person for the welding cell so that a welder has real-time work instructions to guide the welding operation.

The CPU operably connected to the computer node displays on a computer display screen textual information about the sequence of welds being performed or completed and graphical information about the sequence being performed or completed by superimposing real-time information from the welding operation onto a pre-captured digitized image of the welded assembly. The superimposed image shows the location of each weld in the welded assembly and indicates which welds in the welded assembly are defective or do not meet a predetermined quality. Because of the part-tracking function of the program, the CPU can further display individualized information detected by the weld sensor means concerning the quality of any particular weld in a welding operation or any particular welded assembly from any particular welding operation.

Digital information to help coordinate the welding process can be provided in real-time to the welder using a display means inside the welder's welding helmet. The display means can be an audible signal or as a visual signal. An example of information that can be provided to the welder by the display means is a weld-end indicator, which provides to the welder an indication of when the end of a weld has been reached. This weld-end information indicates when a weld has reached a pre-set duration and is of sufficient length. The weld-end information can be provided to the welder by an light emitting diode, a miniature display device, or another visual or audible indicator positioned inside the welder's helmet. The weld-end indicator is turned on as soon as the welding starts and is turned off when the welding has reached its proper time duration. When the weld-end indicator comprises a visual display, the weld-end indicator is placed in the peripheral vision of the welder.

Another example of information that can be provided to the welder is a next-weld indicator, which includes a visual text display that is provided to the welder by a display means inside the welder's helmet. The next-weld indicator provides visible information to the welder about the status of the last weld such as whether it passes or fails in quality, or particular fault information, and it provides visual information relating to the next weld to be performed in the welding sequence. The next-weld information is similar in content to the information presented in the computer node's 4×20 text display. The next-weld indicator can include an audio device inside the welder's helmet, which provides the next-weld information audibly.

FIG. 1 is a schematic diagram that illustrates the basic operating setup of the arc-weld monitoring with part-tracking system of the present invention. The arc-weld monitoring with part-tracking system operates a computer network comprising one or more computer nodes operably connected by a network to a computer processing unit. Each computer node 10 receives sensor inputs 12 and digital inputs 14 from welding cell 16 in which one or more welds is being applied to a workpiece (not shown). Each computer node 10 can display real-time information concerning a weld on text display screen 11. Sensor inputs 12 consist of weld quality information provided by current sensor 18, wire feed sensor 20, voltage sensor 22, and gas flow sensor 24. Digital inputs 14 consist of information related to workpiece start-end 26 and includes clamp indicator 28 or one-shot indicator 30. Alternatively, the workpiece start-end can be programmed into computer node 10 and include time relationships 32 or weld count 34 alone. Computer node 10 processes sensor input 12 and digital input 14 and generates digital output 36 consisting of machine indicators 38 that include process fault 40, process warning 42, and maintenance alarm 44. Digital output 36, which indicates the status of the weld just completed and the requirements for the next weld to be made, can be provided to the welder who is welding the workpiece or to a system operator for monitoring an automated welding operation. In a preferred embodiment, when a weld is determined to be defective, digital output 36 will also cause the welding operation to stop, which allows the defective weld to be repaired or the workpiece with the defective weld to be discarded. The novel feature of the arc-weld monitoring with part-tracking system of the present invention is that computer node 10 is programmed to keep track of sensor input 12 and digital input 14 for each weld of a plurality of welds in the workpiece (work procedure) and the quality determination made for each weld in the work procedure.

Computer processing unit (CPU) 46, which has computer display screen 47, is operatively connected 48 to computer node 10. CPU 46 operates the computer program that is used to configure computer node 10 for a particular welding operation and to receive the information from computer node 10 for data logging, further weld analysis, statistical process control (SPC), and part-tracking. Information concerning the welds is displayed on computer display screen 47. CPU 46 can be connected to a plurality of computer nodes for monitoring welding operations in a plurality of welding cells by means of a computer network (not shown). The part-tracking function keeps track of all information related to the welding operations received by each computer node (not shown).

Figure 2:
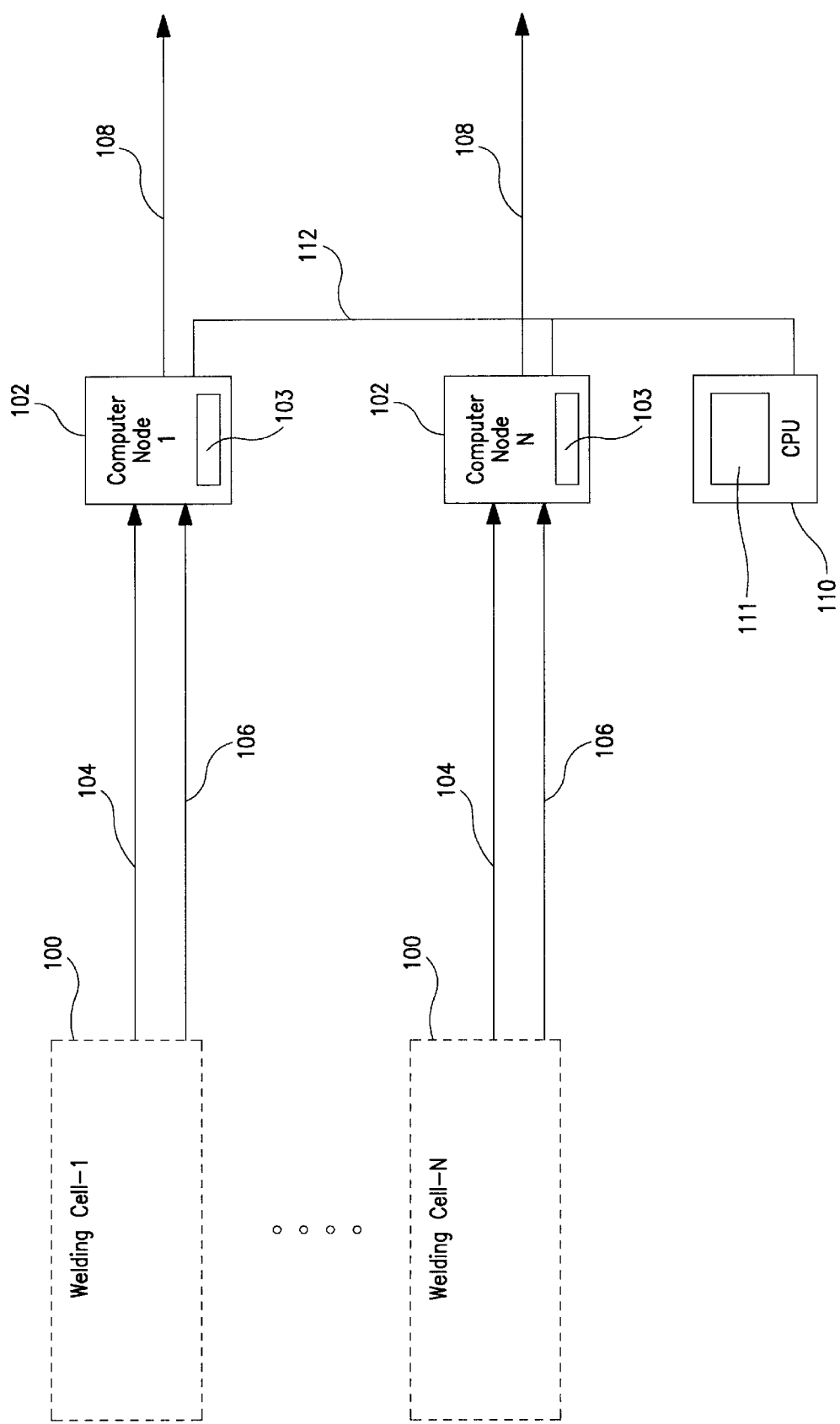
FIG. 2 is a schematic diagram the coordinated part-tracking function of the arc-weld monitoring with part-tracking system in an operation where one or more welding cells are involved in welding an assembly.

FIG. 2 is a schematic diagram that illustrates the coordinated part-tracking function of the arc-weld monitoring with part-tracking system in an operation with more than one welding cell 100. Each welding cell 100 can be manual or robotic and in an operation consisting of multiple welding cells, the welding cells can be any combination of manual and robotic welding cells. Each welding cell 100 has the welds therein monitored by computer node 102, with text display 103 for displaying real-time information concerning a weld, dedicated to the particular welding cell 100. Computer node 102 receives sensor input 104 from the current, wire feed, voltage, and gas flow sensors (not shown) in welding cell 100. Computer node 102 also receives digital input 106 for workpiece start-stop information (not shown), which includes a clamp indicator or a one-shot indicator (nor shown). Alternatively, the workpiece start-end can be programmed into computer node 102 and include time relationships or weld count alone (not shown). Computer node 102 processes sensor input 104 and digital input 106 and generates digital output 108 consisting of machine indicators that include process fault, process warning, and maintenance alarm (not shown).

Each computer node 102 is operably connected to CPU 110, with computer display screen 111, by means of high-speed network 112 such as an RS-485 network. CPU 110 comprising the arc-weld monitoring with part-tracking system performs a set of machine algorithms which coordinates the information relating to each individual weld made in each welding cell 100 which is provided by its corresponding computer node 102. CPU 110 reorders the information in the proper sequence and association for a set of workpieces going through a welding operation.

The arc-weld monitoring with part-tracking system program is set up before configuring each welding cell 100 to be monitored and includes the staging or timing information necessary for sorting the information from each welding cell 100. At the end of the welding operation, CPU 110 displays on computer display screen 111 a visual representation of the welded assembly for inspection which is coordinated with the time at which the welded assembly arrives at an inspection station (not shown) or to the operator for removal of the welded assembly from the fixture after the final welding operation (not shown). Digital input 106 for each welding cell 100 is as above. However, in addition to those digital inputs, additional digital inputs can be used to identify which fixture or workpiece is being processed.

Figure 3:
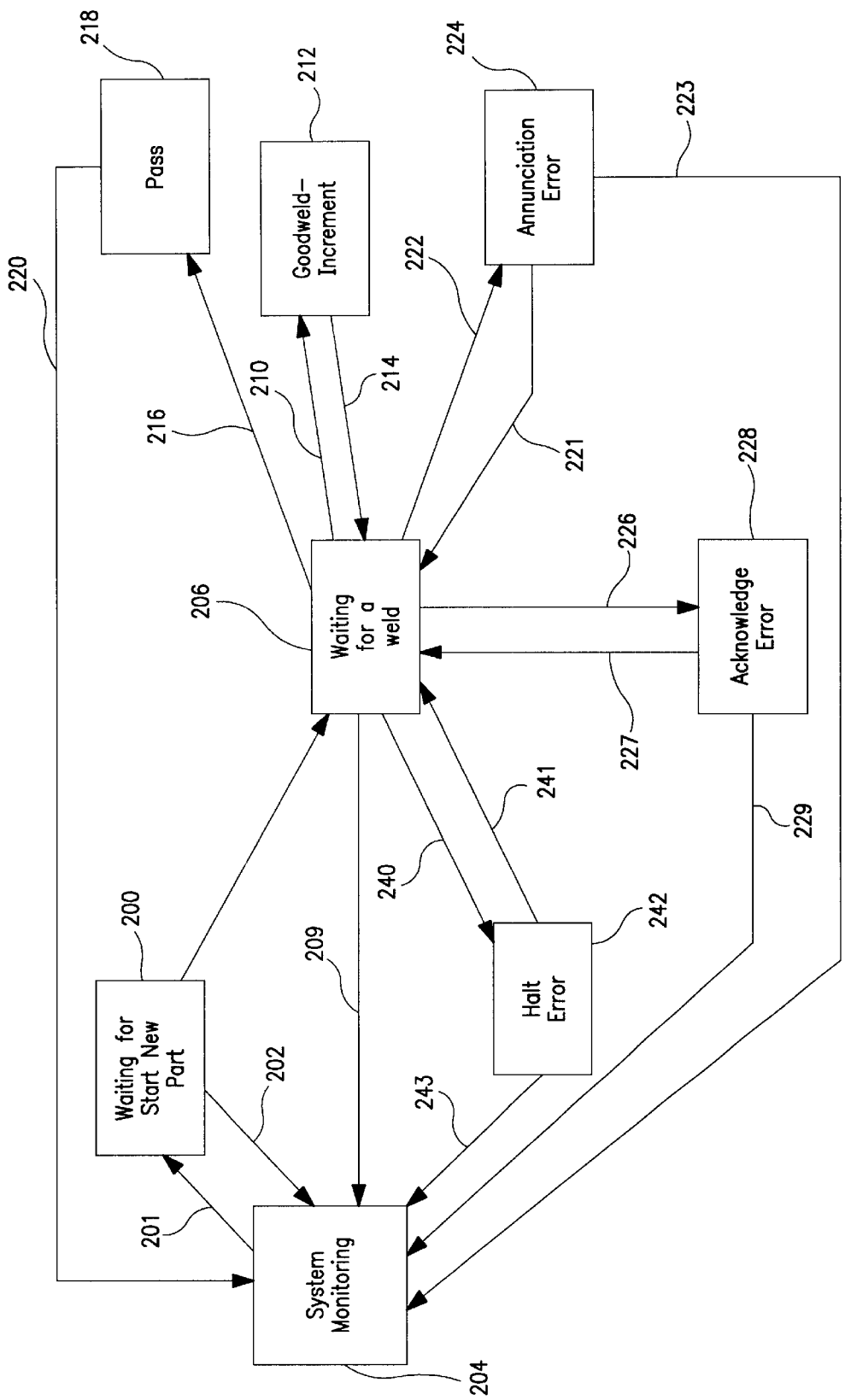
FIG. 3 is a schematic diagram of the interaction of the functions of the arc-weld monitoring with part-tracking system of the present invention in a manual welding state.

FIG. 3 is a schematic diagram that illustrates interaction of the functions of the arc-weld monitoring with part-tracking system of the present invention in a manual welding state. The system consists of the computer node operably connected to the sensors in the welding cell, which are all under the operational control of a CPU that runs the arc-weld monitoring with part-tracking system program.

Before a welding operation, the system is turned on and the system is in a waiting for start new part indication mode 200. The operator mounts a workpiece in the fixture, which automatically activates the system to waiting for a weld mode 206. Alternatively, the operator can activate the system by pressing a palm button (not shown). When the system is activated, a status report 202 is sent to system monitoring 204, which sets system monitoring 204 to on. Also, fixture or button report 208 places the system in waiting for a weld mode 206 in which the display screens of the CPU (not shown) are updated, the correct start of the mounted workpiece is recognized by the CPU, the workpiece count is incremented by the CPU to correspond to the mounted workpiece, the weld count is set by the CPU to 1, the weld schedule for the first weld is set is set by the CPU, the welding apparatus is enabled, and the wire feeder is put in an operational mode.

In waiting for a weld mode 206, the system is ready for welding to begin. After each weld on the workpiece is performed, the quality of the weld is validated per the weld schedule. When the weld is determined to be good per the weld schedule, weld report 210 causes the system to increment weld number 212, which in weld report 214, updates the display, sets the weld schedule for the next weld, and places the system in waiting for a weld mode 206. Also, status report 209 indicating the weld is good is sent to system monitoring 204 which stores status report 214 for the weld. After the last weld in the sequence has been made and validated, weld report 216 indicates the workpiece is complete and the welds pass per the weld schedule for each of the welds 218. This causes status report 220 to be sent to system monitoring 204, which in turn causes status report 201 to place system in start new part indication mode 200. System monitoring 204 stores status report 220.

When a weld fails, waiting for a weld mode 206 sends weld report 222 indicating annunciation error 224, weld report 226 indicating acknowledge error 228, or weld report 240 indicating halt error 242. In each case, the welding operation can be stopped until the defective weld causing the error has been corrected.

In the case of annunciation error 224, reset is not required 221 for the welding operation to continue and the operator is allowed to continue and complete or repair the weld. Status report 223 is sent to system monitoring 204, however, the system is not stopped. System monitoring 204 stores annunciation error 224 for the workpiece.

In the case of acknowledge error 228, status report 229 is sent to system monitoring 204 which stops the welding operation. The operator must acknowledge the error by sending button report 227 to waiting for a weld mode 206 before being allowed to continue. To ensure acknowledgment by the operator, the welding operation remains off until status report 209 is sent to system monitoring 204 indicating that the error has been acknowledged. System monitoring 204 stores acknowledge error 229 for the workpiece.

In the case of halt error 242, status report 243 is sent to system monitoring 204, which stops the welding operation until halt error 242 has been rectified. No response 241 by operator is required because system is shut down until halt error 242 has been rectified. In general, the operator can rectify the error in the following manner. The system is placed in a setup mode (not shown) which enables the wire feed to be fully operational. Then the operator can repair the defective weld and the operator's supervisor manually increments the weld count to the next weld number and puts the system monitoring 204 into waiting for a weld mode 206. The welding sequence then continues as if it the error had not occurred. Alternatively, the operator can finish the rest of the welds in the sequence in the stopped mode under supervision of the operator's supervisor. After the welds have been completed, the supervisor resets system monitoring 204 to waiting for start new part indication mode 200. Or in a further alternative, the workpiece is discarded and the system is reset to waiting for new part indication mode 200. System monitoring 204 stores halt error 242 for the workpiece.

At the conclusion of the welding operation, the CPU (not shown) running the arc-weld monitoring with part-tracking system of the present invention coordinates and analyzes the status reports for all of the welds of the welded assembly. The CPU provides a visual display of the welds superimposed on the welded assembly with the quality of the weld indicated and provides a detailed analysis of each of the welds.

The arc-weld monitoring with part-tracking system of the present invention addresses situations where the operator makes a mistake on a weld or fails to complete all the welds on a workpiece. The arc-weld monitoring with part-tracking system prevents the operator from disabling monitoring by making the wire feeder kill switch default to open (off) when the monitoring is turned off. To prevent the operator from resetting the system, the system can be placed in a secured environment which makes it is inaccessible by the operator without a security key. To prevent the operator from disabling the proximity switch, the proximity switch can be designed so that it must be operational for the operator to start welding. The wire feed switch can be cabled to prevent the operator from disabling the wire feed switch. The system uses current time so that if the operator disables the voltage sensor, the system remains unaffected unless voltage limits are enabled and exceeded. The system can be designed so that if the operator disables the current sensor, the system shuts down when the proximity switch and the wire feeder in on for longer than the time needed to make a weld.

Figure 4:
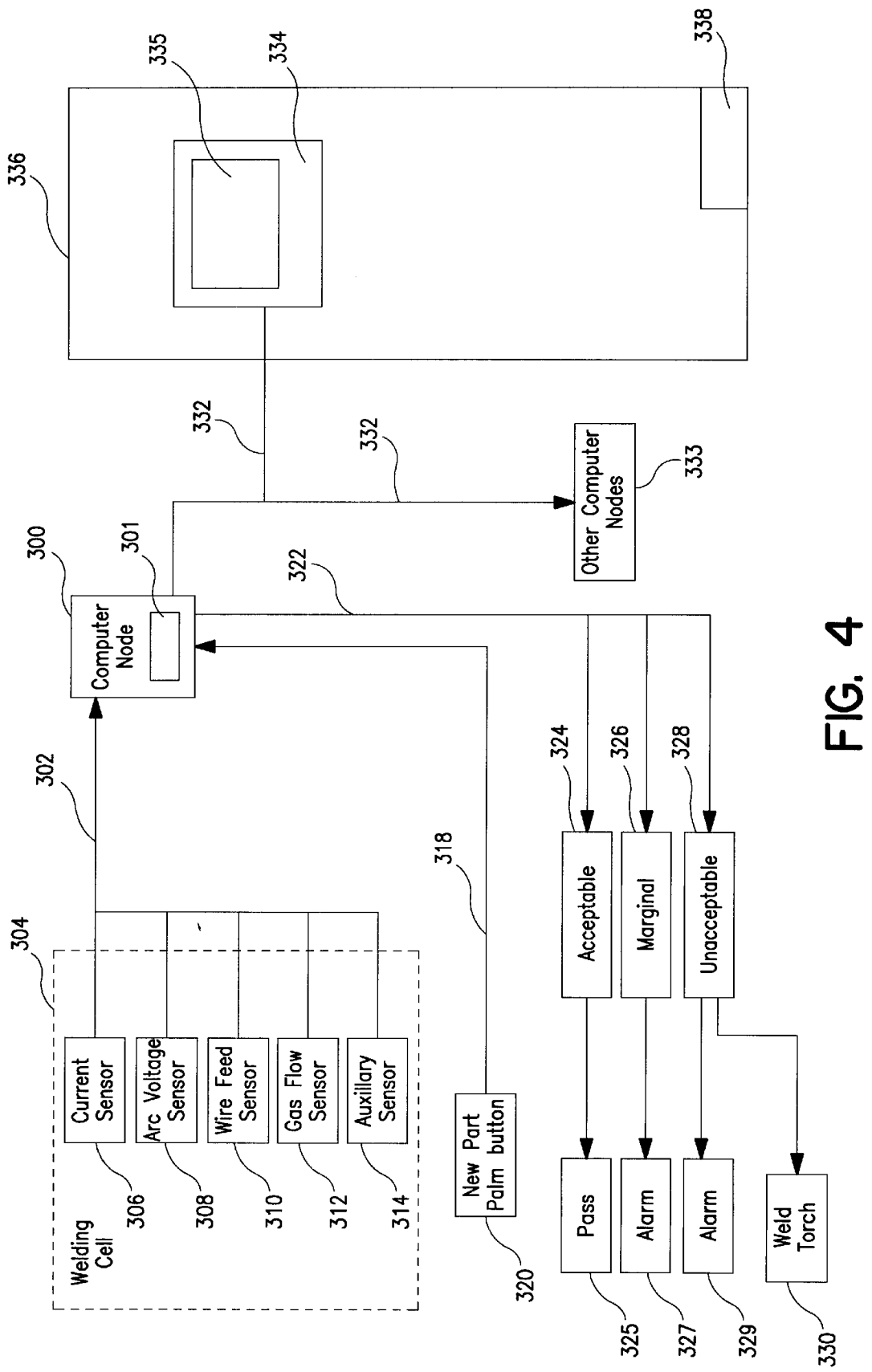
FIG. 4 is a schematic diagram of the operation of the arc-weld monitoring with part-tracking system of the present invention in a semi-automated (manual) welding process.

FIG. 4 is a schematic diagram that illustrates operation of the arc-weld monitoring with part-tracking system of the present invention in a semi-automated or manual welding process. The arc-weld monitoring with part-tracking system operates a computer network comprising one or more computer nodes operably connected by a network to a computer processing unit. In this embodiment, each computer node 300, which can have text display 301, receives sensor inputs 302 from welding cell 304 in which one or more welds is being applied to a workpiece (not shown). Sensor inputs 302 consist of weld quality information provided by current sensor 306 and voltage sensor 308, and optionally, wire feed sensor 310, gas flow sensor 312, and auxiliary sensor 314. Each computer node 300 receives digital input 318 consisting of a signal from new part palm button 320 which is operated by the welder. Computer node 300 processes sensor input 302 for each weld and then generates digital output 322 to the welder indicating the weld is acceptable 324 and passes 325 because it meets the schedule set for the weld (handshake) or fails because of either a process deviation that makes the weld marginal 326 or a major fault that makes the weld unacceptable 328. When the weld fails, an alarm 327 and 329 is signaled to the operator and in the case of an unacceptable weld, the weld torch 330 is disabled. Computer node 300 is networked using a high speed network 332 to other computer nodes 333 operably connected to other welding cells (not shown) and it is operably connected to CPU 334 with computer display screen 335.

CPU 334 operates the computer program that is used to configure computer node 300 for a particular welding operation and to receive the information from computer node 300 for data logging, further weld analysis, statistical process control (SPC), and part-tracking. CPU 334 can be connected to a plurality of computer nodes for monitoring welding operations in a plurality of welding cells by means of high speed computer network 332. The part-tracking function keeps track of all information related to the welding operations received by each computer node (not shown). CPU 334 can be enclosed within ruggedized Hoffman enclosure 336 to protect CPU 334 and can further include fan 338 for cooling. Optionally, CPU 334 can further include one or more of an Iomega ZIP drive, CD-ROM read/write drive, a color printer, company network card and software, and a modem.

A preferred embodiment of the computer program for performing the arc-monitoring with part-tracking of the present invention is provided on the CD entitled "Part Tracking Patent Impact Engineering May 29, 2001," which provide a preferred embodiment of the computer program codes for performing the arc-weld monitoring with part-tracking system of the present invention. Two CDs have been provided. Each CD, designated as Copy 1 or Copy 2, is identical and each CD is hereby incorporated herein by reference. Each compact disc, which has an IBM-PC machine format and is compatible with MS-Windows, contains the 14 ASCII compliant files of computer program codes enumerated below. The computer programs are compatible with Microsoft WINDOWS and can be adapted to a plurality of computer operating systems such as Linex and UNIX.

The following programs were created for the present invention.

AdvancePartTrackingConfigDlg.cpp is an implementation file. The program in its present format was created May 2, 2001 and contains 6,000 bytes.

AdvancePartTrackingConfigDlg.h is a header file for AdvanceParttrackingConfigDlg.cpp. The program in its present format was created Jan. 24, 2001, and contains 2,226 bytes.

PartHist.cpp is an implementation file. This class is a CDocument Summary of part history on the network. The program in its present format was created Jan. 24, 2001, and contains 8,890 bytes.

PartHistory.h is a header file for PartHistory.cpp. The program in its present format was created Jan. 24, 2001, and contains 4,386 bytes.

PartTrackingConfigDlg.cpp is an implementation file. This Dialog class allows editing of the configuration for automated part-tracking. The program in its present format was created Jan. 24, 2001, and contains 9,166 bytes.

PartTrackingConfigDlg.h is a header file for PartTrackingConfigDlg.cpp. The program in its present format was created Jan. 24, 2001, and contains 4,564 bytes.

PartView.cpp is an implementation file. This View class is fileview for the Part History document. The program in its present format was created Nov. 11, 2000, and contains 11,439 bytes.

PartView.h is a header file for partview.cpp. The program in its present format was created Sep. 22, 2000, and contains 3,648 bytes.

In some cases, program code within the above files used code from earlier created files. Therefore, some dates in the files are dates for the initial creation of the oldest code elements comprising the program. In all cases, the most recent modification date is the creation date for the program code provided herein because the modification date indicates the date that the program was operational for performing the arc-weld monitoring with part-tracking system of the present invention.

The following programs were revised with new code to enable the programs to be operational with the above programs and to enable the entire set of programs to be used to perform the arc-weld monitoring with part-tracking system of the present invention. Therefore, the creation date for the following programs refers to the date the programs were modified with new code to their current form. Thus, the following programs are new.

Network.cpp is an implementation file of the network class. This Document class contains and serializes the network information. The program in its present format was created Apr. 10, 2001, and contains 126,980 bytes.

Network.h is the header file for the network class. The program in its present format was created Mar. 30, 2001, and contains 14,802 bytes.

Node.cpp is an implementation file of the node class. This class is the node document class for the network. The program in its present format was created May 21, 2001, and contains 269,010 bytes.

Node.h is a header file for the node class. The program in its present format was created Apr. 10, 2001, and contains 27,184 bytes.

WkTrkDlg.cpp is an implementation file. This CDialog class is a MODAL dialog that displays information about the work instructions. The program in its present format was created Dec. 11, 2000, and contains 24, 619 bytes.

WkTrkDlg.h is a header file for WkTrkDlg.cpp. The program in its present format was created Dec. 12, 2001, and contains 3,524 bytes.

As used herein, the designation ".h" indicates a header file, which is in Microsoft Visual C++. As used herein, the designation ".cpp" indicates an implementation (code) file, which is in Microsoft Visual C++. The programs are preferably provided in a single executable such as the ARClient.exe, which is available from Impact Engineering (500 E. Biddle, Jackson, Mich.), and which performs the arc-weld monitoring with part-tracking system of the present invention.

While the part-tracking programs disclosed herein provide part-tracking capabilities to the particular arc-weld monitoring system disclosed by the above arc-weld monitoring programs, the part-tracking programs are not limited to only the particular arc-monitoring system disclosed herein. It would be readily apparent to one skilled in the art that the part-tracking function can be incorporated into other arc-weld monitoring systems to produce an arc-weld monitoring with part-tracking system that functions in the manner disclosed herein.

Furthermore, while the above computer programs and files can be used to practice the method and system of the present invention, the method and system of the present invention is not limited solely to the above computer programs and files. The above computer program and files are components of a preferred embodiment of the method and system of the present invention. The method and system of the present invention can be practiced with any computer program and files that allows the user to perform the method and system of the present invention in substantially the same manner as disclosed herein.

The following figures show various computer display screen shots or outputs created by the arc-weld monitoring with part-tracking system using the program codes provided on the CD on a CPU with a Microsoft WINDOWS operating system.

Figure 5:
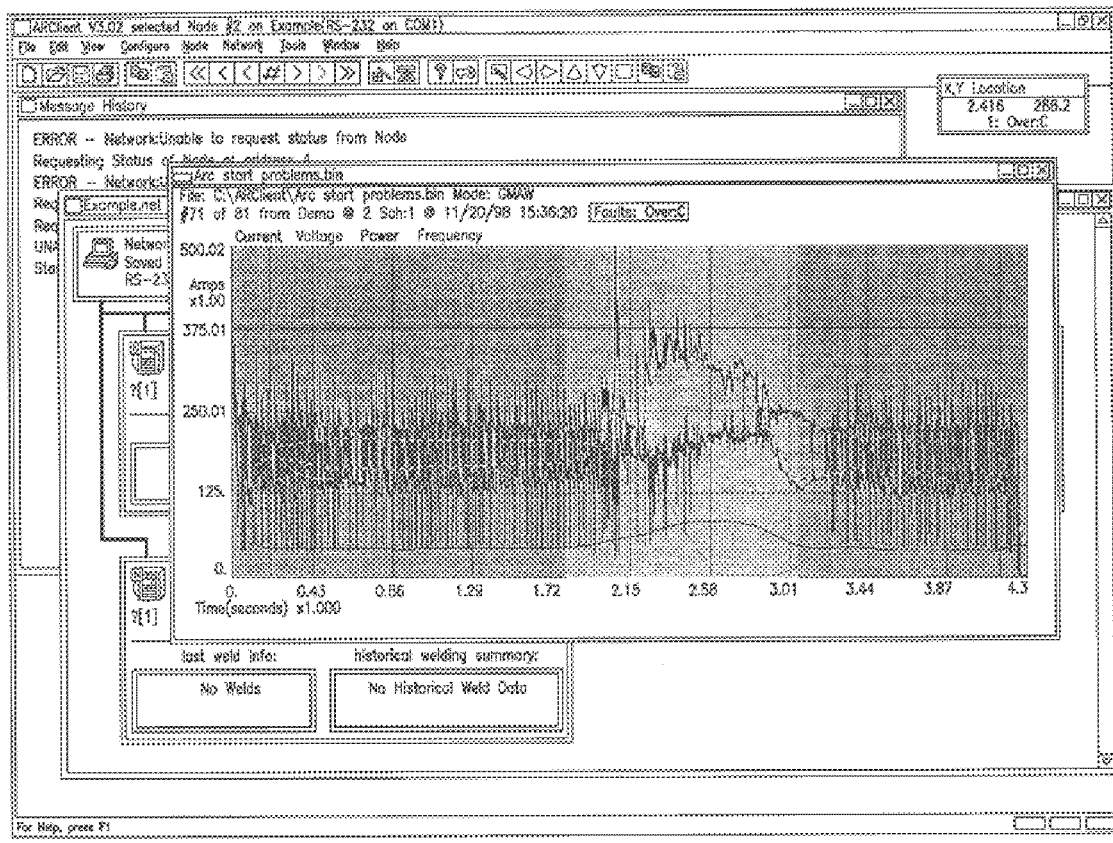
FIG. 5 shows an example of a computer screen display wherein the output shows the signature of a weld produced in a single weld of a GMAW welding operation.

FIG. 5 shows an example of a computer display screen wherein the output is the main display showing the weld signature of a weld produced in a single weld made by GMAW. In this example, the weld signature comprises data for current, voltage, power, and frequency gathered during the making of the weld. The screen shows that the weld was defective because of overcurrent during a portion of the welding. The overcurrent is indicated by the aberrant pattern in the signature at the time period between about 1.72 and 3.01 seconds.

FIG. 6 shows an example of a computer display screen wherein the output provides a tabular display of part-tracking results from a welding operation consisting of a series of seven independent welds made on part (workpiece 3). The table shows that there was one false arc in the series and one weld that was defective because of undervoltage.

Figure 7:
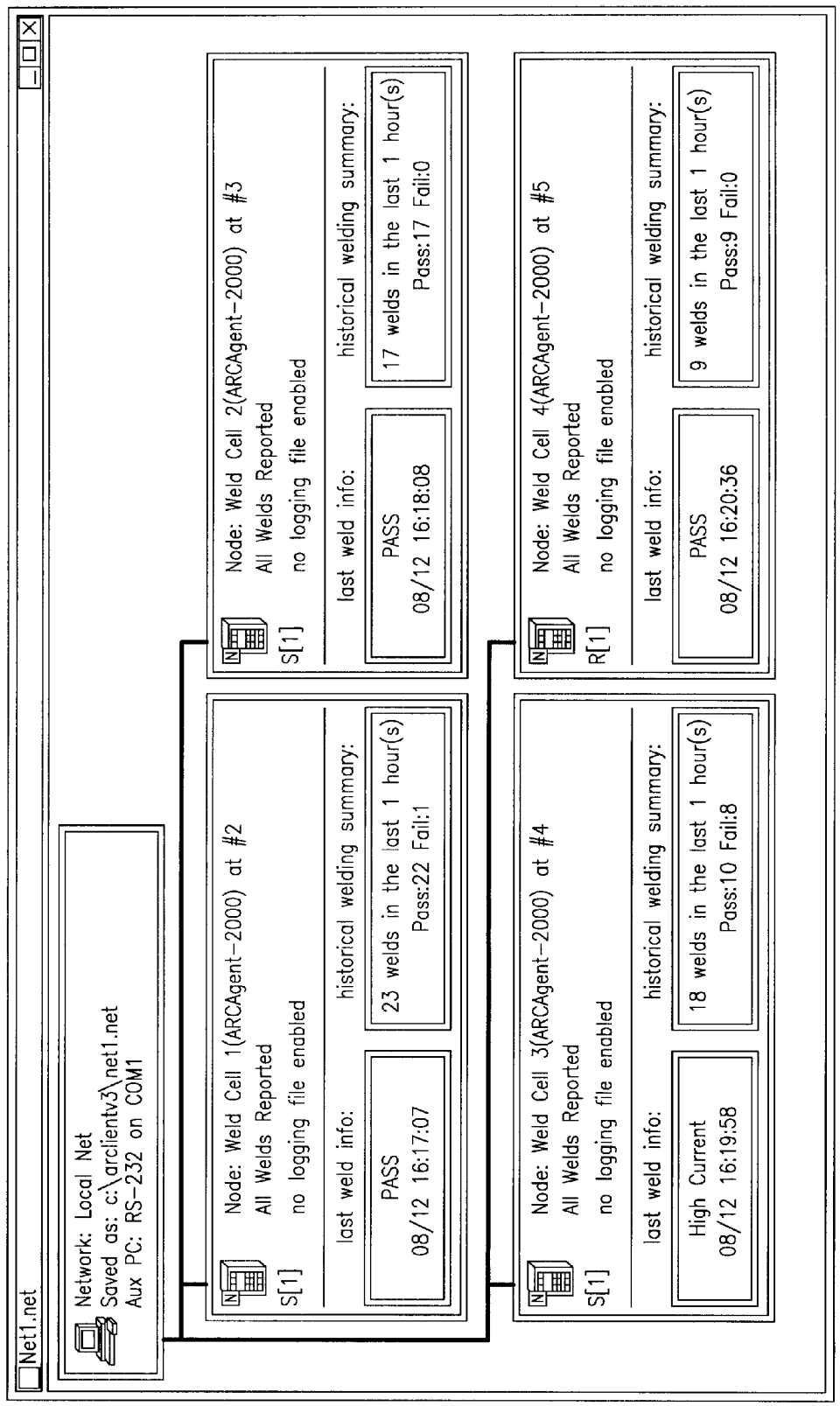
FIG. 7 shows an example of a computer screen display wherein the output provides a network view the arc-weld monitoring system and part-tracking system for welding operations in four welding cells.

FIG. 7 shows an example of a computer screen display wherein the output provides a network view the arc-weld monitoring system and part-tracking system for welding operations in four welding cells. The screen shows the pass/fail status of the last weld in each welding operation, and the total number of welds that had passed or failed in the welding cell in the last hour. The screen display shows that welding cell 3 has had a high rate of weld failures in the past hour and that the last weld failed because of high current and that welding cell 1 has had only one defective weld in the last hour and that welding cells 2 and 4 have had no defective welds.

Figure 8:
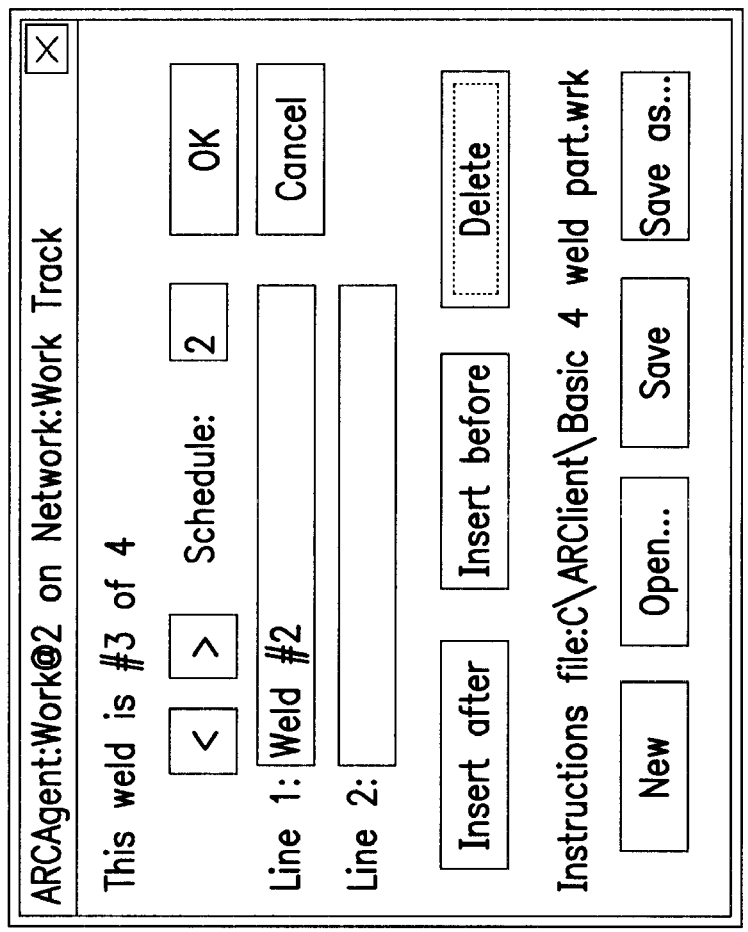
FIG. 8 shows an example of a computer screen display wherein the output shows the part-tracking dialog box for setup of expected weld sequence for validation.

FIG. 8 shows an example of a computer screen display wherein the output shows the part-tracking dialog box for setup of expected weld sequence for validation. The purpose of this dialog box is to create a list of the welds to be performed on the workpiece including, but not limited to, the monitoring schedule to use for the welding operation and two or more lines of descriptive text for each weld in the sequence.

Figure 9:
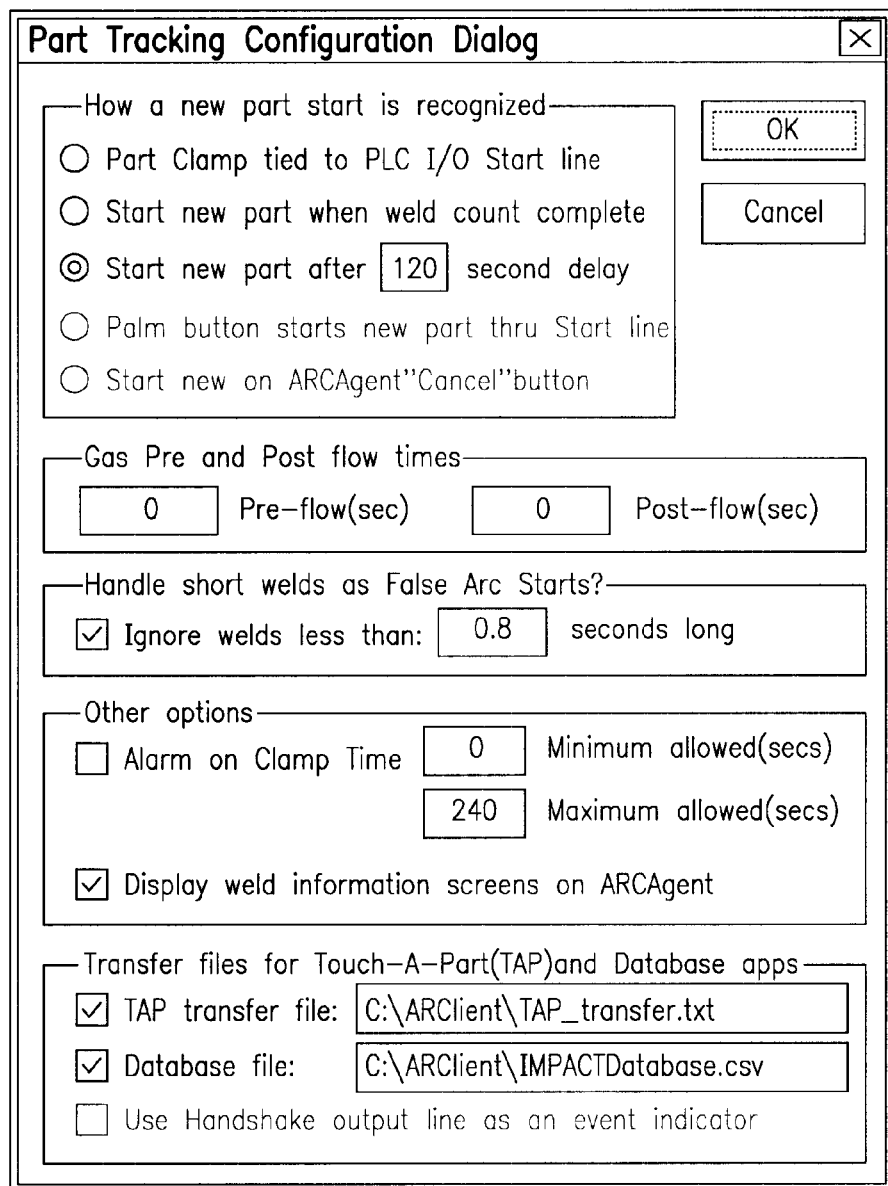
FIG. 9 shows an example of a computer screen display wherein the output shows the part-tracking dialog box for setup of the operating configuration.

FIG. 9 shows an example of a computer screen display wherein the output shows the part-tracking dialog box for setup of the operating configuration. This dialog box allows the operator to indicate how the workpiece is to be recognized, set the rate of gas flow before and after the weld, set the definition for what constitutes a false arc start, and other information such as alarm on clamp time, display of weld information, and transfer of data files.

FIG. 10 shows an example of a computer screen display wherein the output is a report view displaying information about a single weld in a GMAW welding operation. In this example, the screen shows the voltage, current, wire feed and gas flow parameters for weld number 17 on part (workpiece) number 42 made using GMAW.

Figure 11:
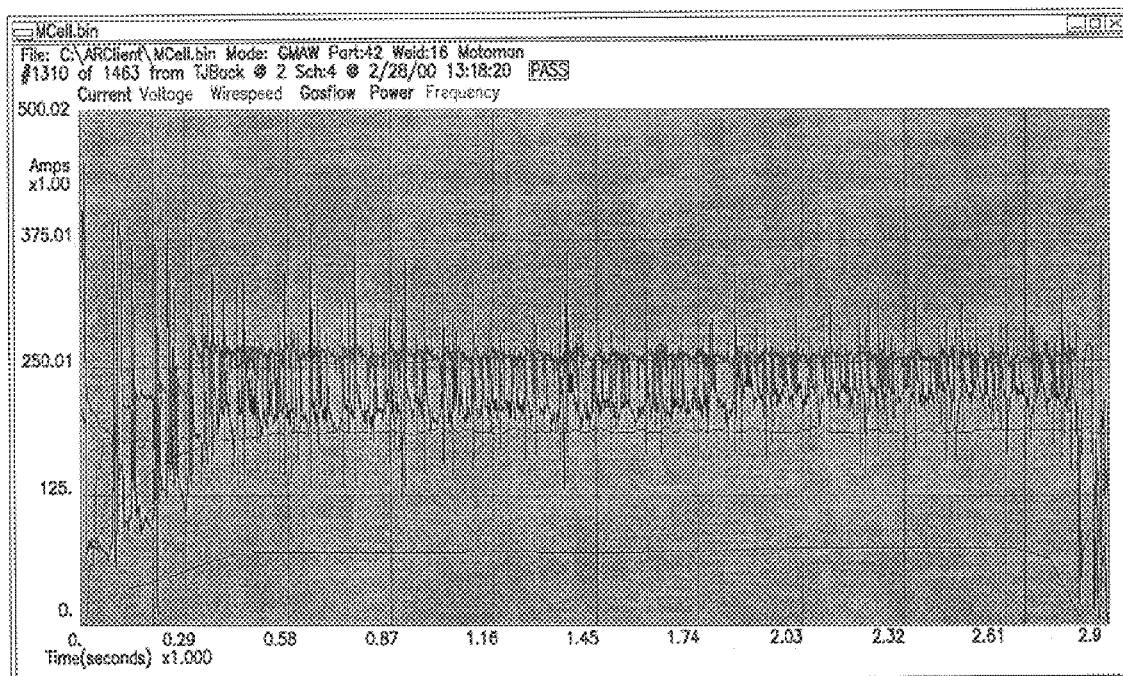
FIG. 11 shows an example of a computer screen display wherein the output is a data view displaying information from a single weld using WELD SIGNATURE.

FIG. 11 shows an example of a computer screen display wherein the output is a data view displaying information from a single weld using WELD SIGNATURE (a registered trademark of Impact Engineering, Jackson, Mich.). In this example, the screen shows the weld signature for weld number 16 on part 42 made by GMAW. The weld signature comprises data for current, voltage, wire speed, gas flow, power, and frequency gathered during the making of the weld. The uniform nature of the weld signature indicates that the weld is not defective.

While the present invention is described herein with reference to illustrated embodiments, it should be understood that the invention is not limited hereto. Those having ordinary skill in the art and access to the teachings herein will recognize additional modifications and embodiments within the scope thereof. Therefore, the present invention is limited only by the claims attached herein.

I claim:

1. A method for welding of components of a workpiece with multiple arc welds in a fixture using a consumable electrode wire, melting the wire by heat from an electric arc having a current and voltage which comprises:
(a) providing a system with the fixture having
  (i) one or more weld sensor means for determining a weld count and for detecting a quality of each weld on the workpiece on the fixture for welding the workpiece;
  (ii) a program in a computer to continuously monitor an output from the one or more weld sensor means and provide weld data in the computer wherein the weld data includes a number of the weld on the workpiece and the quality of the weld; and
  (iii) a switch means connected to the computer for starting a period during which the multiple welds are counted and monitored and then completed and for terminating the monitoring;
(b) placing components which form the workpiece in the fixture, welding the workpiece with the multiple welds while counting each weld and determining the quality of each weld; and
(c) removing the workpiece from the fixture, wherein the program in the computer provides monitoring of each of the multiple welds by means of the one or more weld sensor means between the starting and terminating of the monitoring by the switch means.

2. The method of claim 1, wherein the weld sensor means is selected from the group consisting of a sensor that measures the voltage of the arc, a sensor that measures the current between the components of the workpiece and the wire being welded, a sensor that measures the rate of gas flow, and a sensor that measures a rate of feed of the wire to the arc.

3. The method claim 1, wherein the multiple welds are performed as simultaneous multiple welds.

4. The method of claim 1, wherein the multiple welds are performed in series.

5. The method of claim 1, 2, 3, or 4, wherein the welding is performed manually.

6. The method of claim 1, 2, 3, or 4, wherein the welding is performed by computer controlled robotic welders.

7. The method of claim 1, 2, 3, or 4, wherein the program in the computer provides a completion or fault signal for each of the multiple welds.

8. The method of claim 1, 2, 3, or 4, wherein the program in the computer provides a completion or fault signal for each of the multiple welds with a display of the workpiece and the multiple welds on a computer display screen so that individual welds of the multiple welds are shown as completed or having the fault.

9. The method of claim 1, wherein the switch means is activated or deactivated as a result of opening or closing of a holding means on the fixture for holding the component parts during the welding.

10. The method of claim 1, wherein in addition the program transfers the weld data to a second computer system programmed for receiving a series of weld data for multiples of the workpieces and for selective analysis of the weld data.

11. The method of claim 10, wherein the second computer has a computer display screen which provides a visual display, a printer which provides a printout, or both of the weld data for each of the multiple of the workpieces.

12. The method of claim 1 wherein the system has a false arc sensor for detecting false arc starts and wherein in step (b), when the weld is detected by the false arc sensor as a false arc, the weld is not counted and is not assigned a number and the quality of the weld is not determined.

13. A system for monitoring welding of components of a workpiece with multiple arc welds in a fixture using a consumable electrode wire, melting the wire by heat from an electric arc having a current and voltage which comprises:
(a) one or more weld sensor means to be mounted on equipment for the welding;
(b) a computer having preset weld data for a sequence of welds for the workpiece wherein the preset weld data includes a number indicating a position of the weld in the sequence of welds and weld information for the weld and with a program to continuously monitor output from the one or more weld sensor means, to provide weld data to the computer wherein the weld data includes a number of the weld for the workpiece and a quality of the weld, to associate weld data of the weld with preset weld data by matching the number of the weld from the weld data with the number in the preset weld data and to compare the quality of the weld in the weld data to the weld information for the weld in the preset weld data; and
(c) switch means connected to the computer for starting a period during which the multiple welds are detected by the one or more weld sensor means and counted and monitored by the computer and for terminating the period, wherein the system is used with a fixture with a holding means for welding the components into the workpiece and wherein the program monitors each of the welds for a fault by means of the one or more weld sensor means between the starting and terminating of the monitoring by the switch means.

14. The system of claim 13, wherein the weld sensor means is selected from the group consisting of a sensor that measures the voltage of the arc, a sensor that measures the current between the components of the workpiece and the wire being welded, a sensor that measures the rate of gas flow, and a sensor that measures a rate of feed of the wire to the arc.

15. The system of claim 13, wherein the switch means is activated or deactivated as a result of opening or closing of a holding means on the fixture for holding the components during the welding.

16. The system of claim 13, adapted for monitoring welds produced by one or more computer controlled robots for the welding.

17. The system claim 13, wherein the computer provides a weld completion or fault display on a computer display screen.

18. The system of claim 13, wherein the computer provides a weld completion or fault display on a computer display screen with a display of the workpiece and the multiple welds so that individual welds are shown as completed or with the fault.

19. The system of claim 13, wherein the switch means are started and stopped by opening and closing the holding means which are clamps.

20. The system of claim 13, wherein in addition a second computer system is provided and programmed for receiving a series of weld data for multiples of the workpieces and for selective analysis of the weld data.

21. The system of claim 20, wherein the second computer has a computer display screen which provides a visual display, a printer which provides a printout, or both of the weld data for each of the multiples of the workpieces.

22. In a system for monitoring, in a welding operation, quality of multiple welds on a workpiece using one or more weld sensor means at the location of each of the multiple welds wherein the one or more weld sensor means provide information relating to a number of each weld and the quality of each weld as it is being made on the workpiece, the improvement comprising:

(a) a control means in the system, which determines the start of the multiple welds on the workpiece and the end of the multiple welds on the workpiece or measures a duration of time the workpiece is to be acted upon in the welding operation; and (b) a computer in the system with a program which counts each weld and assigns each weld a number and which monitors the multiple welds on the workpiece between the start and the end and coordinates information relating to the quality of each weld in the multiple welds with a computer display screen which displays the information.

23. The system of claim 22, wherein the multiple welds are monitored by the system simultaneously.

24. The system of claim 22, wherein the multiple welds are monitored in the system in series.

25. The system of claim 22, 23, or 24, wherein the monitoring is where the welding is manual.

26. The system of claim 22, 23, or 24, wherein the monitoring is of welds made by one or more computer controlled robotic welders.

27. The system of claim 22, 23, or 24, wherein the program in the computer provides a completion or fault signal for each of the multiple welds.

28. The system of claim 22, 23, or 24, wherein the program in the computer provides a completion or fault signal for each of the multiple welds with a display of the workpiece and the multiple welds on a computer display screen so that individual welds of the multiple welds are shown as completed or having the fault on the computer display screen.

29. The system of claim 22, wherein in addition the program transfers the weld data to a second computer system programmed for receiving a series of weld data for the workpiece and for selective analysis of the weld data.

30. The system of claim 29, wherein the second computer has a second computer display screen which provides a visual display of the weld data, a printer which provides a printout of the weld data, or both of the workpiece.

31. The system of claim 22, wherein the weld sensor means is selected from the group consisting of a sensor that measures the voltage of the arc, a sensor that measures the current between the components of the workpiece and the wire being welded, a sensor that measures the rate of gas flow, and a sensor that measures a rate of feed of the wire to the arc.

32. The system of claim 22, wherein the computer includes a sequence of welds for the workpiece wherein for each weld in the sequence of welds the computer includes preset weld data including a number indicating a position of the weld in the sequence of welds and weld information for the weld and wherein the program associates weld data of the weld with preset weld data by matching the number of the weld from the weld data with the number in the preset weld data and wherein the program compares the quality of the weld in the weld data to the weld information for the weld in the preset weld data.

33. A system for monitoring welding of components of a workpiece with multiple arc welds in a fixture using a consumable electrode wire, melting the wire by heat from an electric arc having a current and voltage in real-time and for later analysis which comprises:

(a) one or more weld sensor means to be mounted on equipment for the welding;

(b) a computer with a program to continuously monitor output from the one or more weld sensor means and to provide weld data to the computer wherein the weld data includes a number of the weld on the workpiece and a quality of the weld; and (c) switch means connected to the computer for starting a period during which the multiple welds are detected by the one or more weld sensor means and counted and monitored by the computer and for terminating the period, wherein the system is used with a fixture with a holding means for welding the components into the workpiece and wherein the program monitors each of the welds for a fault by means of the one or more weld sensor means between the starting and terminating of the monitoring by the switch means, which provides the monitoring in real-time and for later analysis.

34. The system of claim 33, wherein the weld sensor means is selected from the group consisting of a sensor that measures the voltage of the arc, a sensor that measures the current between the components of the workpiece and the wire being welded, a sensor that measures the rate of gas flow, and a sensor that measures a rate of feed of the wire to the arc.

35. The system of claim 33, wherein the switch means is activated or deactivated as a result of opening or closing of a holding means on the fixture for holding the components during the welding.

36. The system of claim 33, adapted for monitoring welds produced by one or more computer controlled robots for the welding.

37. The system claim 33, wherein the computer provides a weld completion or fault display on a computer display screen.

38. The system of claim 33, wherein the computer provides a weld completion or fault display on a computer display screen with a display of the workpiece and the multiple welds so that individual welds are shown as completed or with the fault.

39. The system of claim 33, wherein the switch means are started and stopped by opening and closing the holding means which are clamps.

40. The system of claim 33, wherein in addition a second computer system is provided and programmed for receiving a series of weld data for multiples of the workpieces and for selective analysis of the weld data.

41. The system of claim 40, wherein the second computer has a computer display screen which provides a visual display, a printer which provides a printout, or both of the weld data for each of the multiples of the workpieces.

42. A method for welding of components of a workpiece with multiple arc welds in a fixture using a consumable electrode wire, melting the wire by heat from an electric arc having a current and voltage which comprises:

(a) providing a system with the fixture having (i) one or more weld sensor means for determining a weld count and for detecting a quality of each weld on the workpiece on the fixture for welding the workpiece;

(ii) a program in a computer to continuously monitor the output from the one or more weld sensor means and provide weld data in the computer wherein the weld data includes a number of the weld on the workpiece and a quality for the weld; and (iii) a switch means connected to the computer for starting a period during which the multiple welds are counted and monitored and then completed and for terminating the monitoring;

(b) placing components which form the workpiece in the fixture, welding the workpiece with the multiple welds while counting each weld and assigning each weld a number and determining the quality of each weld; and (c) removing the workpiece from the fixture, wherein the program in the computer provides monitoring in real-time and for later analysis of each of the multiple welds by means of the one or more weld sensor means between the starting and terminating of the monitoring by the switch means.

43. The method of claim 42, wherein the weld sensor means is selected from the group consisting of a sensor that measures the voltage of the arc, a sensor that measures the current between the components of the workpiece and the wire being welded, a sensor that measures the rate of gas flow, and a sensor that measures a rate of feed of the wire to the arc.

44. The method claim 42, wherein the multiple welds are performed as simultaneous multiple welds.

45. The method of claim 42, wherein the multiple welds are performed in series.

46. The method of claim 42, 43, 44, or 45, wherein the welding is performed manually.

47. The method of claim 42, 43, 44, or 45, wherein the welding is performed by computer controlled robotic welders.

48. The method of claim 42, 43, 44, or 45, wherein the program in the computer provides a completion or fault signal for each of the multiple welds.

49. The method of claim 42, 43, 44, or 45, wherein the program in the computer provides a completion or fault signal for each of the multiple welds with a display of the workpiece and the multiple welds on a computer display screen so that individual welds of the multiple welds are shown as completed or having the fault.

50. The method of claim 42, wherein the switch means is activated or deactivated as a result of opening or closing of a holding means on the fixture for holding the component parts during the welding.

51. The method of claim 42, wherein in addition the program transfers the weld data to a second computer system programmed for receiving a series of weld data for multiples of the workpieces and for selective analysis of the weld data.

52. The method of claim 51, wherein the second computer has a computer display screen which provides a visual display, a printer which provides a printout, or both of the weld data for each of the multiple of the workpieces.

53. A method for monitoring multiple arc welds performed on components to form a workpiece which comprises the steps of:

(a) providing weld sensors for counting the welds and for detecting a quality of each weld on the workpiece;

(b) providing a computer having preset weld data for a sequence of welds for the workpiece, the preset weld data including a number for each weld identifying a position of the weld in the sequence of welds and weld information for each weld;

(c) providing a program for use with the computer to continuously monitor an output of the weld sensors and to provide weld data for each weld, the weld data including a number of the weld identifying when the weld was performed on the workpiece and information about the quality of the weld;

(d) a switch connected to the computer for starting and terminating a period during which the multiple welds are performed on the workpiece;

(e) positioning the components which form the workpiece;

(f) activating the switch to start the period and activate the program;

(g) welding the components together to form the workpiece wherein during the welding the program counts and monitors the welds and provides weld data for the welds;

(h) associating the weld data of the weld with preset weld data by matching the number of the weld from the weld data with the number in the preset weld data; and (i) comparing the quality of the weld in the weld data to the associated weld information for the weld in the preset weld data.

* * * * *

UNITED STATES PATENT AND TRADEMARK OFFICE
CERTIFICATE OF CORRECTION

PATENT NO.    : 6,583,386 B1
DATED         : June 24, 2003
INVENTOR(S)   : Stephen P. Ivkovich It is certified that error appears in the above-identified patent and that said Letters Patent is hereby corrected as shown below:

Column 9,
Line 23, "part tacking" should be -- part tracking --.
Line 56, "so as they can viewed" should be -- so they can be viewed --.

Column 12,
Line 11, "two type" should be -- two types --.
Line 27, "brake petal" should be -- brake pedal --

Column 13,
Lines 37 and 38, "to be begin" should be -- to begin --.
Line 45, "to the another" should be -- to another --

Column 15,
Line 48, "textual" should be -- textural --.
Line 65, "or as a visual" should be -- or a visual --.

Column 17,
Lines 22 and 23, "(nor shown)" should be -- (not shown) --.

Column 18,
Line 9, "weld is set is set by" should be -- weld is set by --.
Line 62, "if it the" should be -- if the --.

Column 19,
Line 20, "it is inaccessible" should be -- it inaccessible --.
Line 31, "in on for" should be -- is on for --.

Column 23,
Line 33, "method claim" should be -- method of claim --.

UNITED STATES PATENT AND TRADEMARK OFFICE
CERTIFICATE OF CORRECTION

PATENT NO. : 6,583,386 B1
DATED : June 24, 2003
INVENTOR(S) : Stephen P. Ivkovich It is certified that error appears in the above-identified patent and that said Letters Patent is hereby corrected as shown below:

Column 24,
Line 45, "system claim" should be -- system of claim --.

Column 26,
Line 31, "system claim" should be -- system of claim --.

Signed and Sealed this

Seventh Day of October, 2003

JAMES E. ROGAN
*Director of the United States Patent and Trademark Office*